(12) United States Patent
Zhou et al.

(10) Patent No.: US 12,034,655 B2
(45) Date of Patent: Jul. 9, 2024

(54) DCI BASED XCARRIER REPETITION AND BEAM SWEEP

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Seyed Ali Akbar Fakoorian, San Diego, CA (US); Mostafa Khoshnevisan, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/911,053

(22) Filed: Jun. 24, 2020

(65) Prior Publication Data
US 2021/0007124 A1 Jan. 7, 2021

Related U.S. Application Data

(60) Provisional application No. 62/872,096, filed on Jul. 9, 2019, provisional application No. 62/871,126, filed on Jul. 6, 2019.

(51) Int. Cl.
*H04L 5/00* (2006.01)
*H04L 1/1812* (2023.01)
(Continued)

(52) U.S. Cl.
CPC ............ *H04L 5/001* (2013.01); *H04L 1/1812* (2013.01); *H04L 5/0055* (2013.01); *H04W 72/21* (2023.01);
(Continued)

(58) Field of Classification Search
CPC ....... H04B 7/0695; H04L 1/0072; H04L 1/08; H04L 1/1812; H04L 1/1822;
(Continued)

(56) References Cited

U.S. PATENT DOCUMENTS

| 9,014,129 B2 * | 4/2015 | Aiba ................... | H04W 72/042 370/329 |
| 9,094,061 B2 * | 7/2015 | Wang ................... | H04B 7/0617 |

(Continued)

FOREIGN PATENT DOCUMENTS

| BR | 112021006795 A2 * | 7/2021 | ............. H04B 7/024 |
| CN | 112368971 A * | 2/2021 | ........... H04L 1/1854 |

(Continued)

OTHER PUBLICATIONS

Huawei et al., Discussion on the multi-TRP/panel transmission in NR, May 21, 2018, 3GPP TSG RAN WG1 Meeting #93, Tdoc: R1-1807130 (Year: 2018).*

(Continued)

*Primary Examiner* — Eric Nowlin
(74) *Attorney, Agent, or Firm* — Norton Rose Fullbright US LLP

(57) ABSTRACT

Scheduling using downlink control information (DCI) is disclosed. In a particular implementation, a method of wireless communication includes receiving, by a user equipment (UE), downlink control information (DCI) via an entity of a plurality of entities. The method also includes determining, by the UE based on the DCI, scheduling information for multiple transmissions on different entities of the plurality of entities.

30 Claims, 12 Drawing Sheets

(51) Int. Cl.
    *H04W 72/02* (2009.01)
    *H04W 72/21* (2023.01)
    *H04W 72/23* (2023.01)
    *H04W 74/08* (2009.01)
    *H04W 74/0833* (2024.01)

(52) U.S. Cl.
    CPC ....... *H04W 72/23* (2023.01); *H04W 74/0833* (2013.01); *H04L 5/0048* (2013.01)

(58) Field of Classification Search
    CPC ..... H04L 5/0007; H04L 5/001; H04L 5/0023; H04L 5/0032; H04L 5/0048; H04L 5/0053; H04L 5/0055; H04L 5/0064; H04L 5/0091; H04L 27/2601; H04L 27/2613; H04W 72/0413; H04W 72/042; H04W 72/044; H04W 72/1289; H04W 74/0833
    See application file for complete search history.

(56) References Cited

U.S. PATENT DOCUMENTS

| | | | |
|---|---|---|---|
| 9,148,884 B2 * | 9/2015 | Aiba | H04W 72/0413 |
| 9,591,649 B1 * | 3/2017 | Liu | H04W 72/0486 |
| 9,967,778 B2 * | 5/2018 | You | H04W 74/002 |
| 10,020,917 B2 * | 7/2018 | Lee | H04L 1/188 |
| 10,447,454 B2 * | 10/2019 | Kim | H04L 5/0057 |
| 10,560,873 B2 * | 2/2020 | You | H04W 72/542 |
| 10,674,494 B2 * | 6/2020 | Wang | H04L 5/0053 |
| 10,701,679 B2 * | 6/2020 | Vilaipornsawai | H04L 5/0048 |
| 10,790,892 B2 * | 9/2020 | Manolakos | H04L 5/0094 |
| 10,973,086 B2 * | 4/2021 | Chang | H04W 88/06 |
| 11,095,415 B2 * | 8/2021 | Papasakellariou | H04L 5/001 |
| 11,140,562 B2 * | 10/2021 | Lin | H04B 7/0619 |
| 11,381,294 B2 * | 7/2022 | Manolakos | H04L 1/0013 |
| 2011/0317610 A1 * | 12/2011 | Park | H04L 5/0053 370/312 |
| 2012/0039179 A1 * | 2/2012 | Seo | H04L 5/0092 370/241 |
| 2012/0140746 A1 * | 6/2012 | Zhu | H04W 72/1289 370/336 |
| 2012/0188888 A1 * | 7/2012 | Wang | H04L 5/0025 370/252 |
| 2012/0263121 A1 | 10/2012 | Chen et al. | |
| 2014/0098770 A1 * | 4/2014 | Zhou | H04L 45/16 370/329 |
| 2014/0254522 A1 * | 9/2014 | Aiba | H04W 72/0413 370/329 |
| 2015/0016408 A1 | 1/2015 | Yang et al. | |
| 2015/0181579 A1 * | 6/2015 | Aiba | H04L 5/0037 370/329 |
| 2015/0341915 A1 * | 11/2015 | Lyu | H04W 72/042 370/277 |
| 2016/0285535 A1 * | 9/2016 | Kim | H04W 24/08 |
| 2016/0323854 A1 * | 11/2016 | Gao | H04W 72/085 |
| 2017/0134124 A1 * | 5/2017 | Lee | H04W 72/23 |
| 2017/0332359 A1 | 11/2017 | Tsai et al. | |
| 2018/0091280 A1 * | 3/2018 | Kim | H04W 4/70 |
| 2018/0124753 A1 | 5/2018 | Sun et al. | |
| 2018/0132212 A1 | 5/2018 | Rico Alvarino et al. | |
| 2018/0199212 A1 * | 7/2018 | Lin | H04B 7/0619 |
| 2018/0213443 A1 * | 7/2018 | You | H04W 74/002 |
| 2018/0269952 A1 * | 9/2018 | Nilsson | H04B 7/0639 |
| 2018/0270851 A1 * | 9/2018 | Bhattad | H04W 72/0446 |
| 2018/0278368 A1 * | 9/2018 | Kim | H04L 1/1864 |
| 2019/0215095 A1 * | 7/2019 | Park | H04W 72/0453 |
| 2019/0268971 A1 * | 8/2019 | Talarico | H04L 5/0082 |
| 2019/0281588 A1 * | 9/2019 | Zhang | H04L 5/0051 |
| 2019/0297603 A1 * | 9/2019 | Guo | H04W 72/046 |
| 2019/0357238 A1 * | 11/2019 | Zhou | H04W 24/08 |
| 2020/0007296 A1 * | 1/2020 | Papasakellariou | H04L 5/0042 |
| 2020/0015200 A1 * | 1/2020 | Vilaipornsawai | H04W 72/23 |
| 2020/0015256 A1 * | 1/2020 | Lee | H04L 27/26025 |
| 2020/0022218 A1 * | 1/2020 | Chang | H04W 16/26 |
| 2020/0029355 A1 * | 1/2020 | Liu | H04L 5/0053 |
| 2020/0044712 A1 * | 2/2020 | Manolakos | H04B 7/0626 |
| 2020/0107327 A1 * | 4/2020 | Wang | H04W 72/082 |
| 2020/0213978 A1 * | 7/2020 | Iyer | H04L 5/0078 |
| 2020/0259612 A1 * | 8/2020 | Nakamura | H04L 5/0051 |
| 2020/0412488 A1 | 12/2020 | Zhou et al. | |
| 2021/0013943 A1 * | 1/2021 | Manolakos | H04L 5/0057 |
| 2021/0037551 A1 * | 2/2021 | Khoshnevisan | H04W 72/1263 |
| 2021/0051665 A1 * | 2/2021 | Fakoorian | H04L 1/1607 |
| 2021/0136802 A1 * | 5/2021 | Cirik | H04W 72/1273 |
| 2021/0144700 A1 * | 5/2021 | Lee | H04L 5/001 |
| 2021/0153267 A1 | 5/2021 | Zhang et al. | |
| 2021/0160912 A1 * | 5/2021 | Fakoorian | H04L 1/08 |
| 2021/0184789 A1 * | 6/2021 | Yin | H04L 1/0026 |
| 2021/0219271 A1 | 7/2021 | Takeda et al. | |
| 2021/0250981 A1 * | 8/2021 | Takeda | H04W 72/1273 |
| 2021/0266910 A1 * | 8/2021 | Yliuntinen | H04W 72/0446 |
| 2021/0314954 A1 * | 10/2021 | Miao | H04W 16/28 |
| 2021/0320775 A1 * | 10/2021 | Miao | H04L 5/0053 |
| 2021/0321400 A1 * | 10/2021 | Takeda | H04W 72/1273 |
| 2021/0337528 A1 * | 10/2021 | Lindoff | H04W 72/0406 |
| 2021/0345391 A1 * | 11/2021 | Takeda | H04W 24/08 |
| 2021/0359808 A1 * | 11/2021 | Takeda | H04L 5/0048 |
| 2021/0360429 A1 * | 11/2021 | Reial | H04B 7/088 |
| 2021/0360679 A1 * | 11/2021 | Khoshnevisan | H04W 72/02 |
| 2022/0015128 A1 * | 1/2022 | Liao | H04W 72/042 |
| 2022/0029758 A1 * | 1/2022 | Bae | H04W 48/10 |
| 2022/0116971 A1 * | 4/2022 | Saber | H04L 5/0035 |
| 2022/0123902 A1 * | 4/2022 | Panteleev | H04L 5/0055 |
| 2022/0166541 A1 * | 5/2022 | Takeda | H04L 1/0061 |
| 2022/0209902 A1 * | 6/2022 | Gao | H04W 72/23 |
| 2023/0147122 A1 * | 5/2023 | Canonne-Velasquez | H04L 5/005 370/329 |

FOREIGN PATENT DOCUMENTS

| | | | | |
|---|---|---|---|---|
| CN | 112385160 A | * | 2/2021 | ............... H04L 1/08 |
| CN | 114423088 A | * | 4/2022 | ........... H04L 1/1671 |
| CN | 115039470 A | * | 9/2022 | |
| EP | 3809774 A1 | * | 4/2021 | |
| EP | 3866503 A1 | * | 8/2021 | ............. H04B 7/024 |
| EP | 3809774 A4 | * | 1/2022 | |
| EP | 3982572 A1 | * | 4/2022 | |
| EP | 4068877 A1 | * | 10/2022 | |
| JP | 2020523934 A | * | 8/2020 | |
| JP | WO2020075233 A1 | * | 9/2021 | |
| KR | 20200017474 A | * | 2/2020 | |
| KR | 20210000739 A | * | 1/2021 | |
| KR | 20220047524 A | * | 4/2022 | |
| WO | WO-2013117011 A1 | | 8/2013 | |
| WO | WO-2016175576 A1 | * | 11/2016 | ........... H04B 7/0626 |
| WO | WO-2017078299 A1 | * | 5/2017 | |
| WO | WO-2018232199 A1 | * | 12/2018 | ........... H04L 1/1812 |
| WO | WO-2020009383 A1 | * | 1/2020 | ........... H04L 1/1854 |
| WO | WO-2020075233 A1 | * | 4/2020 | ............. H04B 7/024 |
| WO | WO-2020143908 A1 | * | 7/2020 | ........... H04L 5/0044 |
| WO | WO-2021106169 A1 | * | 6/2021 | |
| WO | WO-2021135251 A1 | * | 7/2021 | ............. H04L 5/001 |
| WO | WO-2021201299 A1 | * | 10/2021 | |
| WO | WO-2022161483 A1 | * | 8/2022 | |

OTHER PUBLICATIONS

Huawei et al., PDCCH repetition for URLLC, Nov. 12, 2018, 3GPP TSG RAN WG1 Meeting #95, Tdoc: R1-1813670 (Year: 2018).*

Huawei et al., Single PDCCH based multi-TRP/panel transmission, Nov. 12, 2018, 3GPP TSG RAN WG1 Meeting #95, Tdoc: R1-1813696 (Year: 2018).*

Huawei et al., Summary of AI: 7.2.8.2 Enhancements on Multi-TRP/Panel Transmission of Offline Discussion, Nov. 12, 2018, 3GPP TSG RAN WG1 Meeting #95, Tdoc: R1-1814003 (Year: 2018).*

Intel Corporation, On multi-TRP/multi-panel transmission, Feb. 25, 2019, 3GPP TSG RAN WG1 Meeting #96, Tdoc: R1-1902502 (Year: 2019).*

(56) References Cited

OTHER PUBLICATIONS

Sharp, Discussion on multi-TRP/panel techniques for URLLC, Feb. 25, 2019, Feb. 25, 2019, 3GPP TSG RAN WG1 Meeting #96, Tdoc: R1-1902671 (Year: 2019).*
Xiaomi, Enhancements on Multi-TRP/Panel Transmission, Feb. 25, 2019, 3GPP TSG RAN WG1 Meeting #96, Tdoc: R1-1902865 (Year: 2019).*
Huawei et al., Reliability/robustness enhancement with multi-TRP/panel, Feb. 25, 2019, 3GPP TSG RAN WG1 Meeting #96, Tdoc: R1-1903101 (Year: 2019).*
NEC, Discussion on multi-TRP operation, Apr. 8, 2019, 3GPP TSG RAN WG1 #96bis, Tdoc: R1-1904663 (Year: 2019).*
Ericsson, On multi-TRP and multi-panel, Apr. 8, 2019, 3GPP TSG RAN WG1 #96bis, Tdoc: R1-1904750 (Year: 2019).*
Spreadtrum Communications, Discussion on Multi-TRP Transmission, Apr. 8, 2019, 3GPP TSG RAN WG1 #96bis, Tdoc: R1-1904784 (Year: 2019).*
China Telecom, Discussion on Multi-TRP/Panel Transmission enhancements, Apr. 8, 2019, 3GPP TSG RAN WG1 #96bis, Tdoc: R1-1904914 (Year: 2019).*
Motorola Mobility et al., Interrupted transmission indication for Multi-TRP Transmission, Apr. 8, 2019, 3GPP TSG RAN WG1 #96bis, Tdoc: R1-1904935 (Year: 2019).*
NTT DOCOMO, Inc, Enhancements on multi-TRP/panel transmission, Apr. 8, 2019, 3GPP TSG RAN WG1 #96bis, Tdoc: R1-1904966 (Year: 2019).*
Qualcomm Incorporated, Multi-TRP Enhancements, Apr. 8, 2019, 3GPP TSG RAN WG1 #96bis, Tdoc: R1-1905026 (Year: 2019).*
Qualcomm Incorporated, Comparison between SFN and other multi-TRP schemes for PDSCH Reliability, Apr. 8, 2019, 3GPP TSG RAN WG1 #96bis, Tdoc: R1-1905030 (Year: 2019).*
Asia Pacific Telecom, Enhancements on Multi-TRP/Panel Transmission, Apr. 8, 2019, 3GPP TSG RAN WG1 #96bis, Tdoc: R1-1905057 (Year: 2019).*
Nokia et al., Enhancements on Multi-TRP/Panel Transmission, Apr. 8, 2019, 3GPP TSG RAN WG1 #96bis, Tdoc: R1-1905064 (Year: 2019).*
Ericsson, Additional evaluation results on different multi-TRP schemes for reliable PDSCH transmission in URLLC, Apr. 8, 2019, 3GPP TSG RAN WG1 #96bis, Tdoc: R1-1905179 (Year: 2019).*
Ericsson, On multi-TRP and multi-panel, Apr. 8, 2019, 3GPP TSG RAN WG1 #96bis, Tdoc: R1-1905513 (Year: 2019).*
Ericsson, Additional evaluation results on different multi-TRP schemes for reliable PDSCH transmission in URLLC, Apr. 8, 2019, 3GPP TSG RAN WG1 #96bis, Tdoc: R1-1905514 (Year: 2019).*
Huawei et al., Enhancements on Multi-TRP/panel transmission, Apr. 8, 2019, 3GPP TSG RAN WG1 #96bis, Tdoc: R1-1905523 (Year: 2019).*
Samsung, Enhancements on Multi-TRP/Panel Transmission, Apr. 8, 2019, 3GPP TSG RAN WG1 #96bis, Tdoc: R1-1905614 (Year: 2019).*
Huawei et al., Evaluation results for multi-TRP/panel transmission, May 13, 2019, 3GPP TSG RAN WG1 Meeting #97, Tdoc: R1-1906036 (Year: 2019).*
Huawei et al., Single PDCCH based multi-TRP/panel transmission, May 13, 2019, 3GPP TSG RAN WG1 Meeting #97, Tdoc: R1-1906037 (Year: 2019).*
Huawei et al., CSI measurement enhancement for multi-TRP/panel transmission, May 13, 2019, 3GPP TSG RAN WG1 Meeting #97, Tdoc: R1-1906038 (Year: 2019).*
Huawei et al., Reliability/robustness enhancement with multi-TRP/panel, May 13, 2019, 3GPP TSG RAN WG1 Meeting #97, Tdoc: R1-1906039 (Year: 2019).*
Huawei et al., Remaining details for DL design on multi-TRP/panel transmission for eMBB, May 13, 2019, 3GPP TSG RAN WG1 Meeting #97, Tdoc: R1-1906040 (Year: 2019).*
Vivo, Further discussion on Multi-TRP/Panel transmission, May 13, 2019, 3GPP TSG RAN WG1 Meeting #97, Tdoc: R1-1906159 (Year: 2019).*
Vivo, Performance evaluation and observations for multi-DCI-based multi-TRP transmission, May 13, 2019, 3GPP TSG RAN WG1 Meeting #97, Tdoc: R1-1906166 (Year: 2019).*
Vivo, Discussion on multi-DCI-based URLLC transmission, May 13, 2019, 3GPP TSG RAN WG1 Meeting #97, Tdoc: R1-1906168 (Year: 2019).*
Spreadtrum Communications, Discussion on Multi-TRP transmission, May 13, 2019, 3GPP TSG RAN WG1 Meeting #97, Tdoc: R1-1906369 (Year: 2019).*
Nec, Discussion on multi-TRP operation, May 13, 2019, 3GPP TSG RAN WG1 Meeting #97, Tdoc: R1-1906398 (Year: 2019).*
Intel Corporation, On multi-TRP/multi-panel transmission, May 13, 2019, 3GPP TSG RAN WG1 Meeting #97, Tdoc: R1-1906815 (Year: 2019).*
Sony, Considerations on Multi-TRP/Panel Transmission, May 13, 2019, 3GPP TSG RAN WG1 Meeting #97, Tdoc: R1-1906838 (Year: 2019).*
China Telecom, Discussion on Multi-TRP/Panel Transmission enhancements, May 13, 2019, 3GPP TSG RAN WG1 Meeting #97, Tdoc: R1-1906886 (Year: 2019).*
International Search Report and Written Opinion—PCT/US2020/039628—ISA/EPO—datec Dec. 7, 2020 (193722WO).
OPPO: "Enhancements on Multi-TRP and Multi-panel Transmission", 3GPP TSG RAN WG1 Meeting #96, 3GPP Draft; R1-1902701, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 15, 2019, 8 Pages, XP051600396, Retrieved from the Internet: URL: http://www.3gpp.org/ftp/tsg%5Fran/WG1%5FRL1/TSGR1%5F96/Docs/R1%201902701%2Ezip [retrieved on Feb. 15, 2019], Sections 1, 2.1, 4.1-4.3.
Partial International Search Report—PCT/US2020/039628—ISA/EPO—dated Oct. 12, 2020 (193722WO).
Huawei., et al., "Enhancements on Multi-TRP/Panel Transmission", 3GPP Draft, 3GPP TSG RAN WG1 Ad-Hoc Meeting 1901, R1-1900017, 3rd Generation Partnership Project (3GPP), Mobile Competence Centre, 650, Route Des Lucioles, F-06921 Sophia-Antipolis Cedex, France, vol. RAN WG1, No. Taipei, 20190121-20190125 Jan. 20, 2019 (Jan. 20, 2019), XP051592944, 15 Pages, section 2, figure 7, sections 1, 2.1.2, 3.1.
Huawei, et al., "Summary of AI: 7.2.8.2 Enhancements on Multi-TRP/Panel Transmission of Offline Discussion", 3GPP TSG RAN WG1 Ad-Hoc Meeting 1901, R1-1901371, 3rd Generation Partnership Project, Mobile Competence Centre, 650, Route Des Lucioles, F-06921 Sophia-Antipolis Cedex, vol. RAN WG1, No. Taipei, 20190121-20190125, Jan. 23, 2019, XP051594129, 39 Pages, Sections 2.2-2.3, p. 18-p. 24, Parts 2.1.4 and 2.3, sections 1, 2.3, 4.
NTT DOCOMO, et al., "Enhancements on Multi-TRP/Panel Transmission", 3GPP TSG RAN WG1 Meeting #94bis, R1-1811348, 3rd Generation Partnership Project, Mobile Competence Centre, 650, Route Des Lucioles, F-06921 Sophia-Antipolis Cedex, France, Sep. 29, 2018, XP051518751, 21 pages, figures 3-1, tables 3-1, 3-2, sections 3.1-3.5.

* cited by examiner

DCI BASED XCARRIER REPETITION AND BEAM SWEEP

CROSS-REFERENCE TO RELATED APPLICATIONS

This application claims the benefit of U.S. Provisional Patent Application No. 62/872,096, entitled, "DCI BASED XCARRIER REPETITION & BEAM SWEEP," filed on Jul. 9, 2019, and U.S. Provisional Patent Application No. 62/871,126, entitled, "DCI BASED XCARRIER REPETITION & BEAM SWEEP," filed on Jul. 6, 2019, both of which are expressly incorporated by reference herein their entirety.

BACKGROUND

Field

Aspects of the present disclosure relate generally to wireless communication systems, and more particularly, use of downlink control information (DCI) for scheduling.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

5G NR may use one or more frequency ranges, such as frequency range 1 (FR1) or multiple frequency range (FR2). Conventionally, if FR1 for 5G NR, which includes frequencies from 450 megahertz (MHz) to 6 gigahertz (GH) in sub-6 GHz, is absent or otherwise unavailable for a transmission, medium access control (MAC) can be reschedule the transmission on multiple frequency range (FR2) component carries (CCs) for 5G NR. For example, the transmission can be scheduled on FR2, which includes frequencies from 24.25 GHz to 52.6 GHz in mm-Wave, such with the same time block (TB)/code block group (CBG) on the multiple CCs. In such conventional techniques, the same TB can be rescheduled on each TB with a corresponding downlink control information (DCI) as a new transmission with a particular hybrid automatic repeat request (HARQ) identifier (ID). Accordingly, multiple DCIs are needed for the transmission to be rescheduled on each of the multiple CCs. Additionally, with the conventional techniques, an ACK/NACK is communicated on an associated Physical Uplink Control Channel (PUCCH) cell.

However, in the presence of low signal-to-noise ratio (SNR), which may be present due to blocking, a relatively small number of the multiple DCIs may be decoded. If a particular DCI is not decoded, the corresponding scheduled Physical Downlink Shared Channel may fail. Accordingly, conventional techniques of rescheduling a transmission on multiple CCs may be deficient.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), downlink control information (DCI) via an entity of a plurality of entities. The method also includes determining, by the UE based on the DCI, scheduling information for multiple transmissions on different entities of the plurality of entities.

In an additional aspect of the disclosure, an apparatus configured for wireless communication includes means for receiving, by a UE, DCI via an entity of a plurality of entities; and means for identifying, by the UE based on the DCI, scheduling information associated with multiple transmissions on different entities of the plurality of entities.

In an additional aspect of the disclosure, a non-transitory computer-readable medium having program code recorded thereon. The program code includes code to receive, by a UE, DCI via an entity of a plurality of entities; and determine, by the UE based on the DCI, scheduling information for multiple transmissions on different entities of the plurality of entities.

In an additional aspect of the disclosure, an apparatus configured for wireless communication is disclosed. The apparatus includes at least one processor, and a memory coupled to the processor. The processor is configured to receive, by a UE, DCI via an entity of a plurality of entities; and determine, by the UE based on the DCI, scheduling information for multiple transmissions on different entities of the plurality of entities.

In an additional aspect of the disclosure, a method of wireless communication includes identifying, by a base station, DCI communicated via an entity of a plurality of entities. The method also includes scheduling, by the base station based on the DCI, multiple transmissions on different entities of the plurality of entities.

In an additional aspect of the disclosure, an apparatus configured for wireless communication includes means identifying, by a base station, DCI communicated via an entity of a plurality of entities; and means for scheduling, by the base station based on the DCI, multiple transmissions on different entities of the plurality of entities.

In an additional aspect of the disclosure, a non-transitory computer-readable medium having program code recorded thereon. The program code includes code to identify, by a base station, DCI communicated via an entity of a plurality of entities; and schedule, by the base station based on the DCI, multiple transmissions on different entities of the plurality of entities.

In an additional aspect of the disclosure, an apparatus configured for wireless communication is disclosed. The apparatus includes at least one processor, and a memory coupled to the processor. The processor is configured to identify, by a base station, DCI communicated via an entity of a plurality of entities; and schedule, by the base station based on the DCI, multiple transmissions on different entities of the plurality of entities.

In an additional aspect of the disclosure, a method for wireless communication is disclosed. The method includes identifying, by a device (e.g., a base station or a UE), DCI communicated via a first entity of plurality of entities. The method also includes scheduling, by the device, one or more transmission via a second entity of the plurality of entities, the second entity different from the first entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
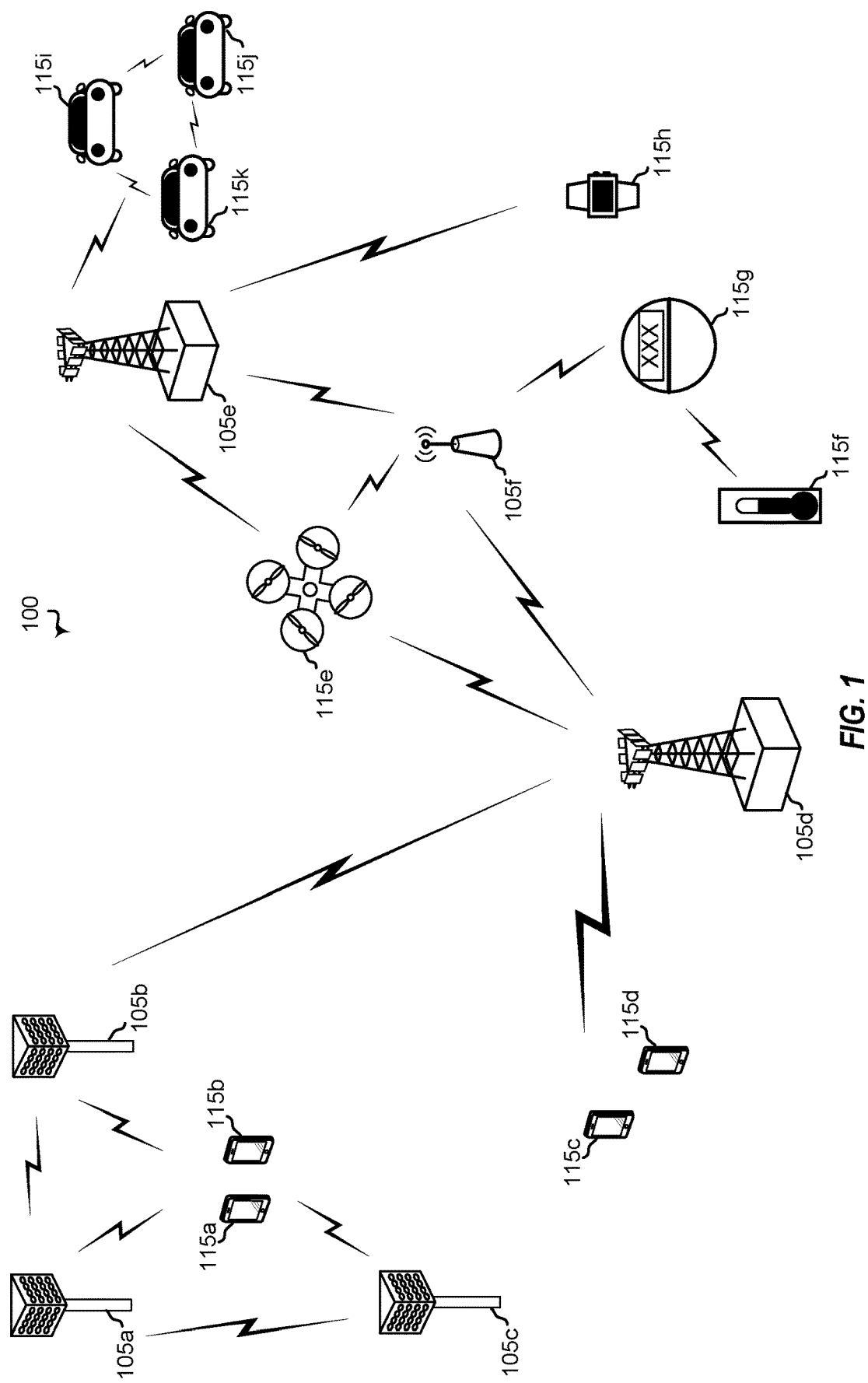
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The described techniques relate to improved methods, systems, devices, and apparatuses for scheduling one or more transmissions using downlink control information (DCI). For example, the one or more transmission may be scheduled by a device (e.g., a base station or UE), based on the DCI, on one or more entities different from the entity via which the DCI is transmitted. The entity may include a component carrier, a cell, or a frequency allocation. If the DCI is received via a first entity, such as a first CC, the one or more transmission may be scheduled on a second entity (different from the first entity) based on the DCI. In some implementations, a transmission may also be scheduled on the first entity in addition to the second entity. As an illustrative, non-limiting example, a UE may receive DCI via an entity of a plurality of entities and schedule, based on the DCI, multiple transmissions on different entities of the plurality of entities. In some implementations, each of the multiple transmissions scheduled on the different entities includes the same content. In other implementations, each of the multiple transmissions scheduled on the different entities include content correlated to content of the other of the multiple transmissions. In yet another implementation, each of the multiple transmissions scheduled on the different entities include independent content from the other of the multiple transmissions.

The one or more transmissions (or the multiple transmissions) may correspond to a channel, which may include Physical Downlink Shared Channel (PDSCH), Physical Uplink Control Channel (PUCCH), Physical Uplink Shared Channel (PUSCH), or Physical Random Access Channel (PRACH), as illustrative, non-limiting examples. In some implementations, the DCI is a single DCI used to schedule multiple transactions across multiple entities (e.g., multiple CCs) such that identical, correlated, or independent information is communicated per transmission. Additionally, or alternatively, the same, single DCI can be repeated over a set of two or more CCs to facilitate UE combining. When the same, single DCI is repeated over the set of two or more CCs, only one DCI of the multiple DCIs needs to be received to schedule one or more transmission on a particular CC, which may be a different CC from which the on DCI was received.

In some aspects, scheduling, based on the DCI, multiple transmissions on different entities may be scrambled by a dedicated radio network temporary identifier (RNTI). In some such implementations, the dedicated RNTI is different from the RNTI for scrambling the DCI scheduling a single transmission on a single entity.

In some aspects, the DCI, such as a single DCI, can include or indicate scheduling information. For example, the DCI may include scheduling information for each of multiple transmission. The scheduling information may include a frequency domain allocation (e.g., a number of resource blocks (RBs), a location of one or more RBs, or both), a time domain allocation (e.g., a start time, a duration, or both), a beam indication (e.g., a transmission configuration indicator (TCI) state, a spatial relation, or a beam sweep pattern—a time division multiplexed (TDMed) beam, a frequency division multiplexed (FDMed) beam, a spatial division multiplexed (SDMed) beam, or a combination thereof), a demodulation reference signal (DMRS) configuration (e.g., typeA/typeB, an initialization sequence, one or more antenna portions, or a combination thereof), a cell identifier (ID), a bandwidth part (BWP) ID, or a combination thereof. Additionally, or alternatively, the scheduling information may include a hybrid automatic repeat request (HARQ) information (e.g., a HARQ process ID, code block group (CBG) information, redundancy version, or a combination thereof), uplink (UL) feedback information (e.g., a PUCCH resource indicator, time distance from PDSCH to PUCCH, downlink (DL) assignment index, or a combination thereof), link adaptation information (e.g., a modulation code scheme (MCS), Transmission Power Control (TPC) command, sounding reference signal (SRS)/channel state information (CSI) request, or a combination thereof), or a combination thereof. In some implementations, a common ACK/NACK may be generated based on combining or individual decoding, and can be sent by PUCCH cell configured per PDSCH repetition receiving cell.

In some implementations, a UE may identify the scheduling information included in the DCI. Additionally, the UE may schedule on or more transmissions (e.g., multiple transmission) based on the identified scheduling information. Additionally, or alternatively, the UE may transmit a common ACK/NACK using multiple transmissions on the different entities of the plurality of entities.

In some implementations, the UE may decode the DCI and, based on the decoded DCI, identify a repetition pattern. For example, in some implementations, a single DCI can schedule xCarrier repetition of PDSCH. For example, the DCI can include an index of a pre-configured repetition pattern, such as a candidate repetition pattern that includes a non-repetition pattern with one transmission on one entity. In some implementations, the repetition pattern indicates a channel is repeated over a set of one of one or more entities and a format/location of the channel per entity. As another example, xCarrier repetition can be scheduled with a pre-configured pattern, such as a pre-configured pattern indicated by one or more bits (e.g., a single bit) of the DCI. Additionally, or alternatively, the same DCI can be repeated over a set of CCs to facilitate UE combining.

In some implementations, a single DCI can schedule xCarrier repetition of PUCCH/PUSCH. In other implementations, a single DCI can schedule xCarrier repetition and beam sweep for PDSCH/PUCCH/PUSCH. In some such implementations, xCarrier PDCCH repetition can be further configured with beam sweep to mitigate blocking.

In some implementations, the different entities include entities of different quasi co-located (QCL) groups. In such implementations, the DCI may indicate carrier repetition, a beam sweep pattern, or both, per QCL group.

In some implementations, a UE supports multiple xCarrier QCL groups. In such implementations, a single DCI can indicate xCarrier repetition and beam sweep pattern per QCL group for PDSCH/PUCCH/PUSCH.

In some implementations, in presence of a frequency range, such as FR1 in 5G, a DCI scheduling xCarrier repetition and beam sweep can also be sent on the first frequency range at least in addition to those sent on a frequency range, such as FR2 in 5G, to improve control robustness, while minimizing resource usage on the first frequency range. The same DCI on the first frequency range can also schedule repetitions on the first frequency range, whose resource can be canceled or reassigned if ACK is received on the second frequency range.

In some implementations, the UE may perform, based on the DCI, beam sweep for a channel, such as PDSCH, PUCCH, PUSCH, or a combination thereof, as illustrative, non-limiting examples. The beam sweep may be applied to each entity of the different entities or may be scheduled per entity. In some implementations, the beam sweep includes a beam sweep pattern that includes a TDMed beam, a FDMed beam, a SDMed beam, or a combination thereof.

Thus, the present disclosure describes techniques relate to improved methods, systems, devices, and apparatuses for scheduling one or more transmissions using DCI. Accordingly, as compared to conventional techniques in which one transmission is scheduled per DCI on an entity (e.g., a CC) via which the DCI was received, the present techniques provide scheduling of one or more transmissions on at least one entity different from the entity via which the DCI was communicated, thereby improving performance, reliability, and scheduling.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks (sometimes referred to as "5G NR" networks/systems/devices), as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be implemented in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used.

A base station may provide communication coverage for a macro cell or a small cell, such as a pico cell or a femto cell, other types of cell, or a combination thereof. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
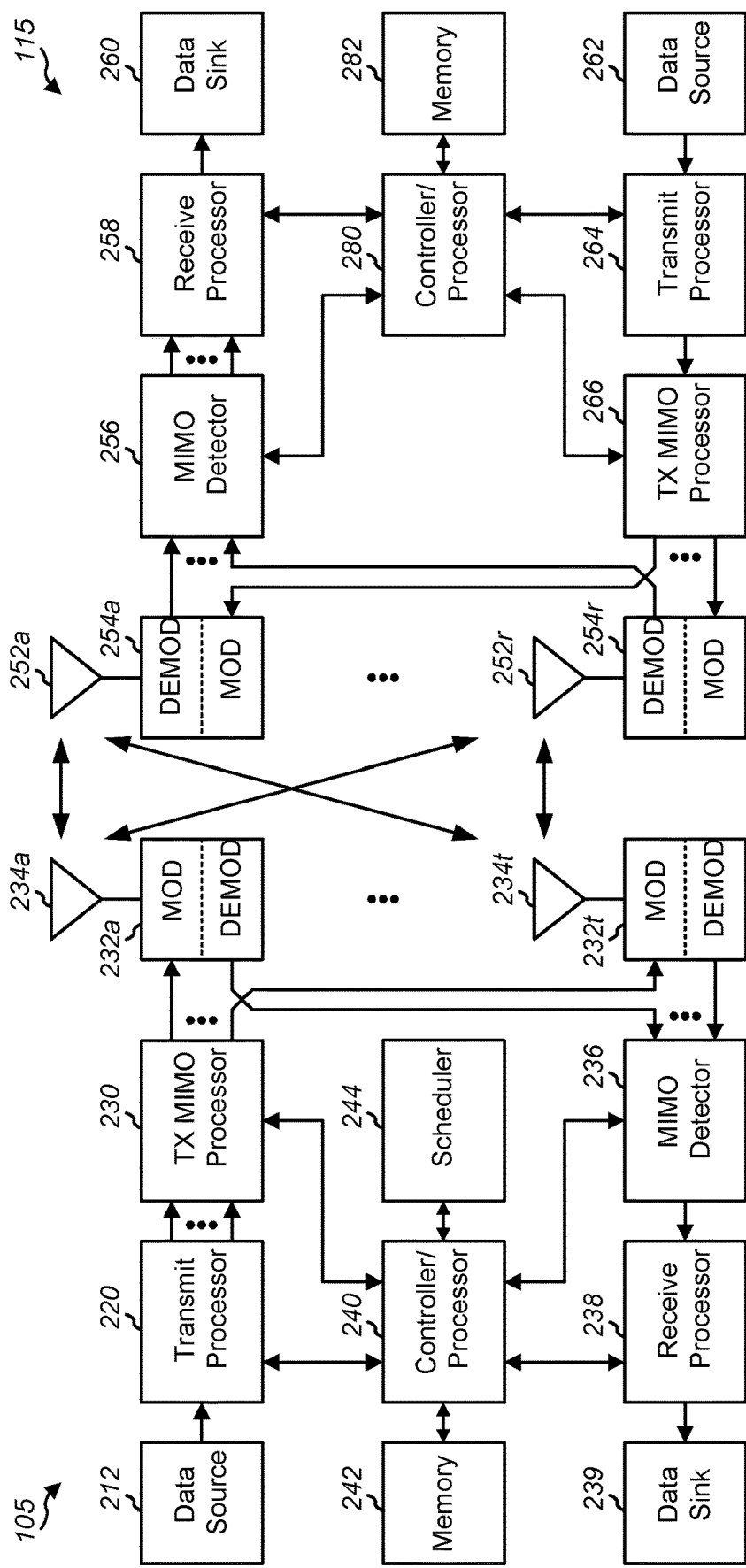
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 or other processors and modules at the base station 105 may perform or direct the execution of various processes for the techniques described herein, such as perform or direct the execution of the function blocks illustrate in FIGS. 9-10. The controllers/processor 280 or other processors and modules at the UE 115 may also perform or direct the execution of the functional blocks illustrated in FIGS. 7-8, or other processes for the techniques described herein. The memories 242 and 282 may store data and program codes for the base station 105 and the UE 115, respectively. A scheduler 244 may schedule UEs for data transmission on the downlink or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
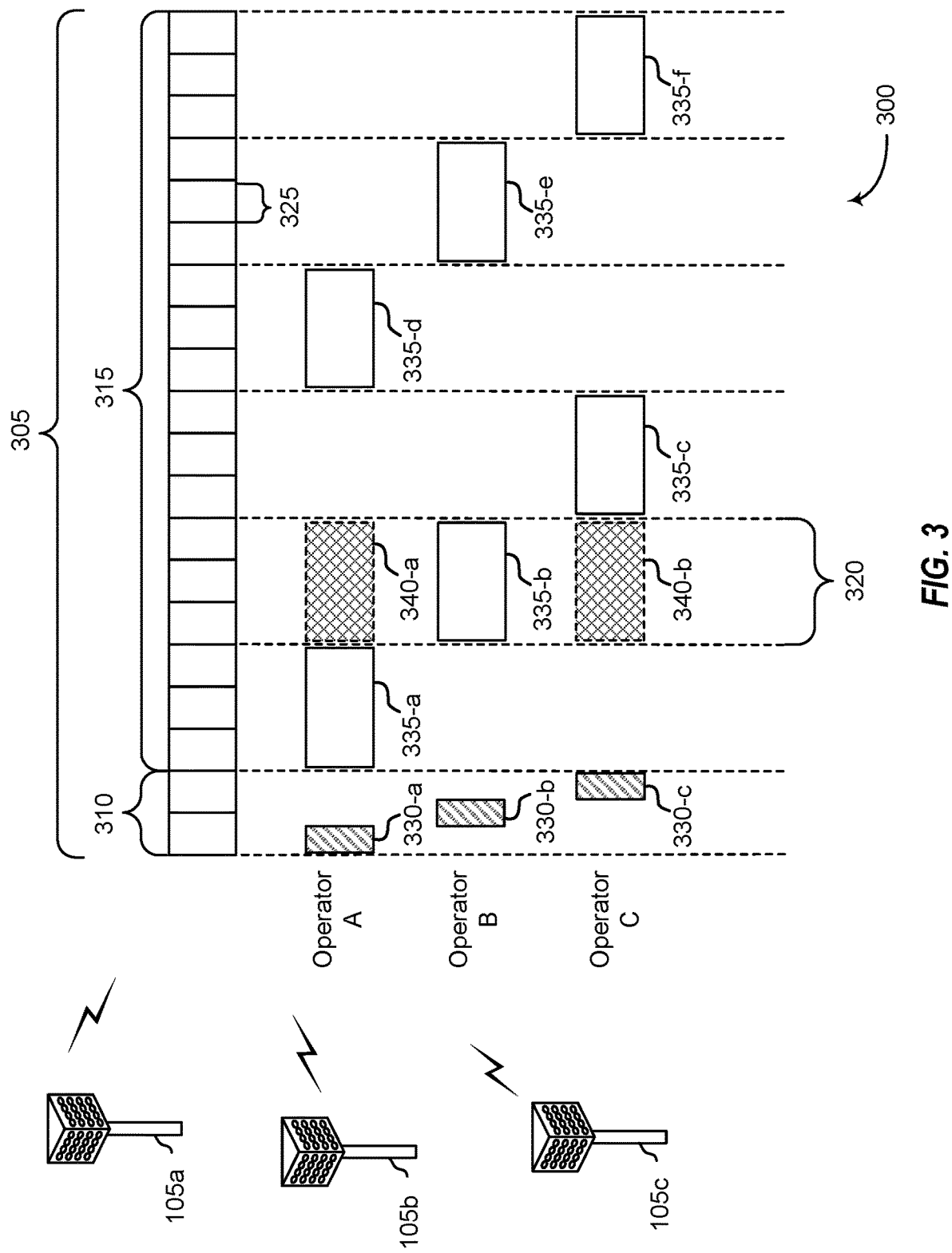
FIG. 3 is a diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., LBT or CCA) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some implementations, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
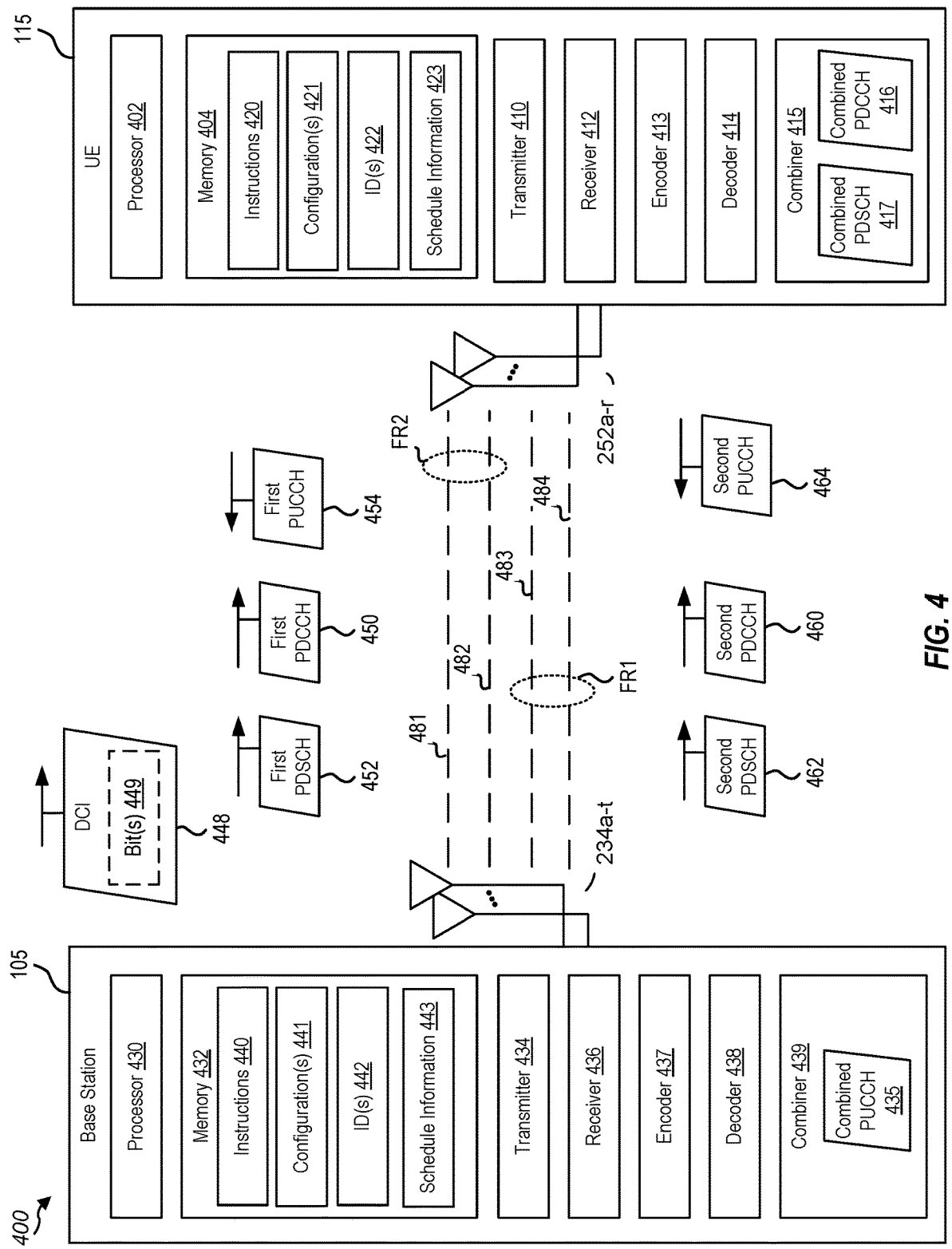
FIG. 4 is a diagram illustrating wireless communication that supports scheduling based on DCI.
Figure 5:
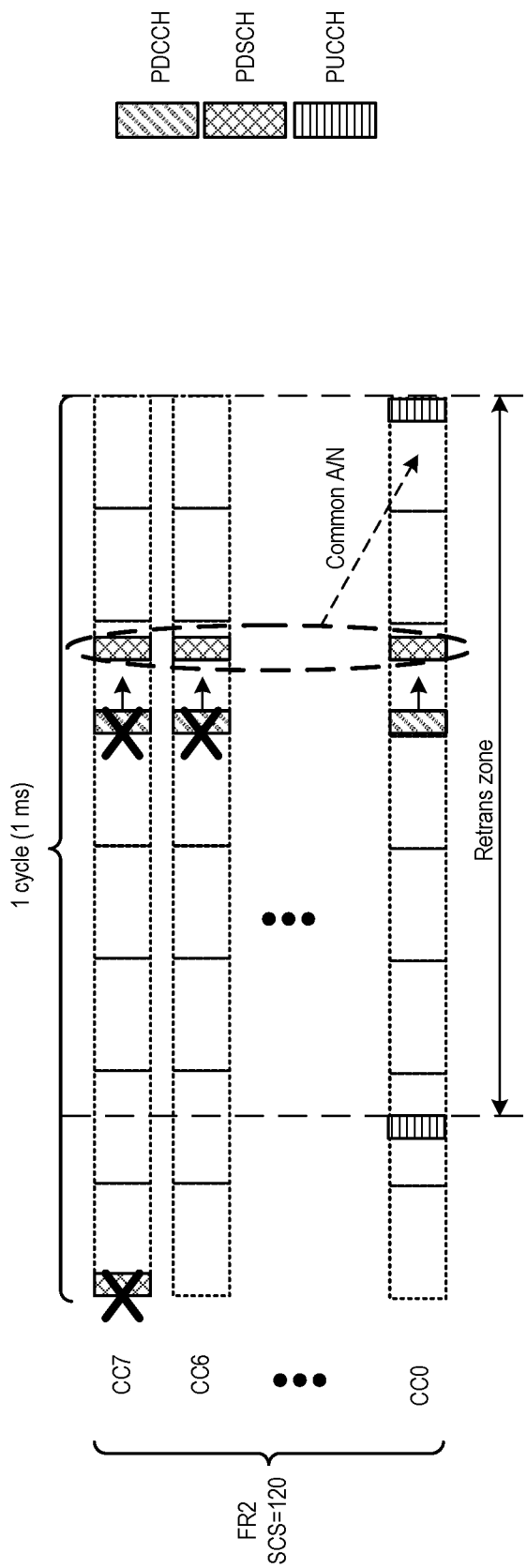
FIG. 5 is a diagram illustrating wireless communication that supports scheduling based on DCI.

FIG. 4 illustrates an example of a wireless communications system 400 that supports scheduling using DCI, in accordance with aspects of the present disclosure. In some examples, wireless communications system 400 may implement aspects of wireless communication system 100. For example, wireless communications system 400 may include base station 105 and UE 115. Base station 105 and UE 115 and base station 105 may be configured to communicate via one or more entities, such as a component carrier, a cell, or a frequency allocation. For example, communications (e.g., transmissions) may occur via one or more channels, such as PDSCH, PUCCH, PUSCH, or PRACH, as illustrative, non-limiting examples.

Base station 105 and UE 115 may be configured to communicate via frequency bands, such as FR1 having a frequency of 450 to 6000 MHz for Sub-6 GHz or FR2 having a frequency of 24250 to 2600 MHz for mm-Wave. It is noted that sub-carrier spacing (SCS) may be equal to 15, 30, 60, or 120 kHz for some data channels, as illustrative, non-limiting examples. Base station 105 and UE 115 may be configured to communicate via one or more CCs, such as representative first CC 481, second CC 482, third CC 483, and fourth CC 484. Although four CCs are shown, this is for illustration only, and more or fewer than four CCs may be used. One or more CCs may be used to communicate Physical Downlink Control Channel (PDCCH), PDSCH, PUCCH, or PUSCH. In some implementations, as an illustrative, non-limiting example, one or more CCs, such as CCs 481, 482, may be included in FR2, and one or more other CCs, such as CCs 483, 483 may be included in FR1.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a cell ID, a BWP ID, or both. The cell ID may include a unique cell ID for the CC, a virtual cell ID, or a particular cell ID of a particular CC of the plurality of CCs. Additionally, or alternatively, one or more CCs may have or be assigned to a HARQ ID. Each CC may also have corresponding management functionalities, such as, beam management, BWP switching functionality, or both. Additionally, or alternatively, each CC may include one or more corresponding beam patterns, a beam sweep pattern, a communication (e.g., transmission/reception) schedule, or a combination thereof.

In some implementations, two or more CCs are quasi co-located, such that the CCs have the same beam or same symbol. Additionally, or alternatively, CCs may be grouped as a set of one or more CCs, such as a xCarrier coreset. Each CC in a coreset may have the same cell ID, the same HARQ ID, or both.

In some implementations, control information may be communicated via base station 105 and UE 115. For example, the control information may be communicated suing MAC-CE transmissions, RRC transmissions, DCI, transmissions, another transmission, or a combination thereof. As shown in FIG. 4, a DCI 448 is communicated from base station 105 to UE 115. DCI 448 includes one or more bits 449. In some implementations, the one or more bits is a single bit. One or more bits 449 may include or indicate schedule information, also referred to as scheduling information. The schedule information may include or correspond to a frequency domain allocation (e.g., a number of RBs, a location of one or more RBs, or both), a time domain allocation (e.g., a start time, a duration, or both), a beam indication (e.g., a TCI state, a spatial relation, or a beam sweep pattern—a TDMed beam, a FDMed beam, a SDMed beam, or a combination thereof), a DMRS configuration (e.g., typeA/typeB, an initialization sequence, one or more antenna portions, or a combination thereof), a cell ID, a BWP ID, or a combination thereof. Additionally, or alternatively, the schedule information may include or correspond to HARQ information (e.g., a HARQ ID, a HARQ process ID, CBG information, redundancy version, or a combination thereof), UL feedback information (e.g., a PUCCH resource indicator, time distance from PDSCH to PUCCH, DL assignment index, or a combination thereof), link adaptation information (e.g., a MCS, Transmission Control Protocol (TCP) command, SRS/channel state information (SCI) request, or a combination thereof), or a combination thereof. In some implementations, the one or more bits 449 may include or correspond to schedule information stored or set at base station 105, UE 115, or both. In a particular implementation, at least a portion of the schedule information is pre-configured, such as based on one or more standards. The schedule information may include or correspond to schedule information 443 at or accessible to base station, schedule information 423 at or accessible to UE 115, or both.

As described herein, a device (e.g., base station 105 or UE 115) is configured to identify DCI 448 communicated via a first entity (e.g., 481) of plurality of entities (e.g., 481-484). The device is further configured to schedule one or more transmission via a second entity (e.g., 482) of the plurality of entities (e.g., 481-484), the second entity (e.g., 482) different from the first entity (e.g., 481). Additional functionality with respect to the device is described herein at least with reference to FIGS. 4-13.

Base station 105 includes processor 430, memory 432, transmitter 434, receiver 436, an encoder 437, decoder 438, combiner 439, and 234a-t. Processor 430 may be configured to execute instructions 440 stored at memory 432 to perform the operations described herein. In some implementations, processor 430 includes or corresponds to controller/processor 240, and memory 432 includes or corresponds to memory 242. Memory 432 may also be configured to store one or more configurations 441, one or more IDs values 442, schedule information 443, or both, as further described herein. The one or more configurations 441 may be bandwidth, bandwidth part, HARQ process, TCI state, RS, control channel resources, data channel resources, or a combination thereof. Additionally, or alternatively, the one or more configurations 441 may include or correspond to the one or more bits 449—e.g., the one or more configurations 441 may include or correspond to one or more pre-configured configurations. The one or more IDs 442 may be a common cell ID (e.g., a virtual cell ID or a particular cell ID of a particular CC of the plurality of CCs) or a common BWP ID.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2. In some implementations, transmitter 434, receiver, 436, or both may be included in one more wireless radios, as described with reference to FIG. 15.

Encoder 437 and decoder 438 may be configured to encode and decode, such as jointly encoding and jointly decoding, respectively. Combiner 439 may be configured to combine xCarrier data to generate combined data, such as combined data for decoding. In some implementations, base station 105 may also include a scheduler configured to perform one or more operations herein described with reference to DCI 448 or scheduling one or more transmissions based on DCI 448.

UE 115 includes processor 402, memory 404, transmitter 410, receiver 412, an encoder 413, decoder 414, combiner 415, and 252a-r. Processor 402 may be configured to execute instructions 420 stored at memory 404 to perform the operations described herein. In some implementations, processor 402 includes or corresponds to controller/processor 280, and memory 404 includes or corresponds to memory 282. Memory 432 may also be configured to store one or more configurations 421, one or more IDs values 422, or both, as further described herein. The one or more configurations 421 may be bandwidth, bandwidth part, HARQ process, TCI state, RS, control channel resources, data channel resources, or a combination thereof. Additionally, or alternatively, the one or more configurations 421 may include or correspond to the one or more bits 449—e.g., the one or more configurations 421 may include or correspond to one or more pre-configured configurations. The one or more IDs 422 may be a common cell ID (e.g., a virtual cell ID or a particular cell ID of a particular CC of the plurality of CCs) or a common BWP ID. The configurations 421 and ID(s) 422 may correspond to configurations 41 and ID(s) 442, respectively.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2. In some implementations, transmitter 410, receiver, 412, or both may be included in one more wireless radios, as described with reference to FIG. 14. Encoder 413, decoder 414, and combiner 415 may include the same functionality as described with reference to encoder 437, decoder 438, and combiner 439, respectively. In some implementations, UE 115 may also include a scheduler configured to perform one or more operations herein described with reference to DCI 448 or scheduling one or more transmissions based on DCI 448.

During operation of wireless communications system 400, base station 105 may identify or generate DCI 448. For example, base station 105 may generate and transmit DCI 448 including one or more bits 449. DCI 448 (e.g., the one or more bits 449) may include or correspond to (e.g., indicate) schedule information (e.g., 443, 423). In some implementations, base station 105 sends DCI 448 to UE 115 to schedule one or more transmissions.

Base station 105 may jointly encode PDCCH to be transmitted via multiple CCs—e.g., xCarrier repetition. For example, base station 105 may transmit first PDCCH 450 via first CC 481 and may transmit second PDCCH 460 via second CC 482. Additionally, base station 105 may jointly encode PDSCH to be transmitted via multiple CCs—e.g., xCarrier repetition. For example, base station 105 may transmit first PDSCH 452 via first CC 481 and may transmit second PDSCH 462 via second CC 482.

UE 115 receives the multiple PDCCH (e.g., 450, 460) and generates a combined PDCCH 416 based on the multiple PDCCH. For example, combiner 415 may be configured to combine energies of the multiple PDCCH to generate combined PDCCH 416. Decoder 414 may decode the combined PDCCH 416. Additionally, UE 115 receives the multiple PDSCH (e.g., 452, 462) corresponding to the multiple PDCCH (e.g., 450, 460) and generates a combined PDSCH 417. For example, combiner 415 may be configured to combine energies of the multiple PDSCH to generate combined PDSCH 417. Decoder 414 may decode the combined PDSCH 417.

Based on the decoding of combined PDSCH 417, UE 115 sends PUCCH to base station 105. For example, UE 115 may use encoder 413 to jointly encode PUCCH into first PUCCH 454 and second PUCCH 464 which are sent to base station 105. To illustrate, first PUCCH 454 may be sent via first CC 481 and second PUCCH 464 may be sent via second CC 482.

It is noted that PUCCH may include or correspond to an acknowledgment message, such as an ACK/NACK. UE 115 may send an ACK or a NACK base on a determination of whether combined PUSCH was successfully decoded. To illustrate, the ACK is communicated if decoding is successful and the NACK is communicated if decoding is unsuccessful.

Base station 105 receives the multiple PUCCH (e.g., 454, 464) and generates a combined PUCCH 4345 based on the multiple PUCCH. For example, combiner 439 may be configured to combine energies of the multiple PUCCH to generate combined PUCCH 435. Decoder 438 may decode the combined PUCCH 435.

Operations of FIG. 4 are described further herein with reference to FIGS. 5-9. FIGS. 5-9 include examples of wireless communication, scheduled based on DCI 448, between base station 105 and UE 115. For example, one or more of FIGS. 5-9 show DCI based xCarrier repetition on downlink or beam sweep. Each of FIGS. 5-9 show multiple CCs over an illustrative cycle, such as a 1 ms cycle. Each of FIGS. 5-9 shows one or more transmissions via the CCs. At least one of the transmission may be scheduled according to a DCI (e.g., 448). The at least one transmission may include or correspond to a channel, such as PDSCH, PUCCH, PUSCH, or PRACH, as illustrative, non-limiting examples. In FIGS. 5-9, an "X" indicates a blocked transmission and elongated ovals indicate different beams. Additionally, different shades of the same color correspond to the same channel Referring to FIG. 5, an example of wireless communication that supports scheduling based on DCI is shown. To illustrate, the wireless communication may include DCI based xCarrier repetition on DL channels. To improve DCI reliability, a DCI (e.g., 484), such as a single DCI, can schedule xCarrier repetition of PDSCH—each CC has the same DCI. UE (e.g., 115) can determine a whole set of multi-CC repetition as long as one DCI is decoded. To minimize DCI overhead, xCarrier repetition can be scheduled with a pre-configured pattern, e.g. a single bit can indicate the PDSCH is repeated over a set of CCs with same format/location per CC. For example, the pre-configured pattern may be included in configurations 421, 441 or schedule information 423, 443. In addition, search space with xCarrier PDCCH repetition can be configured such that the same DCI is repeated over a set of CCs to facilitate UE combining.

Figure 6:
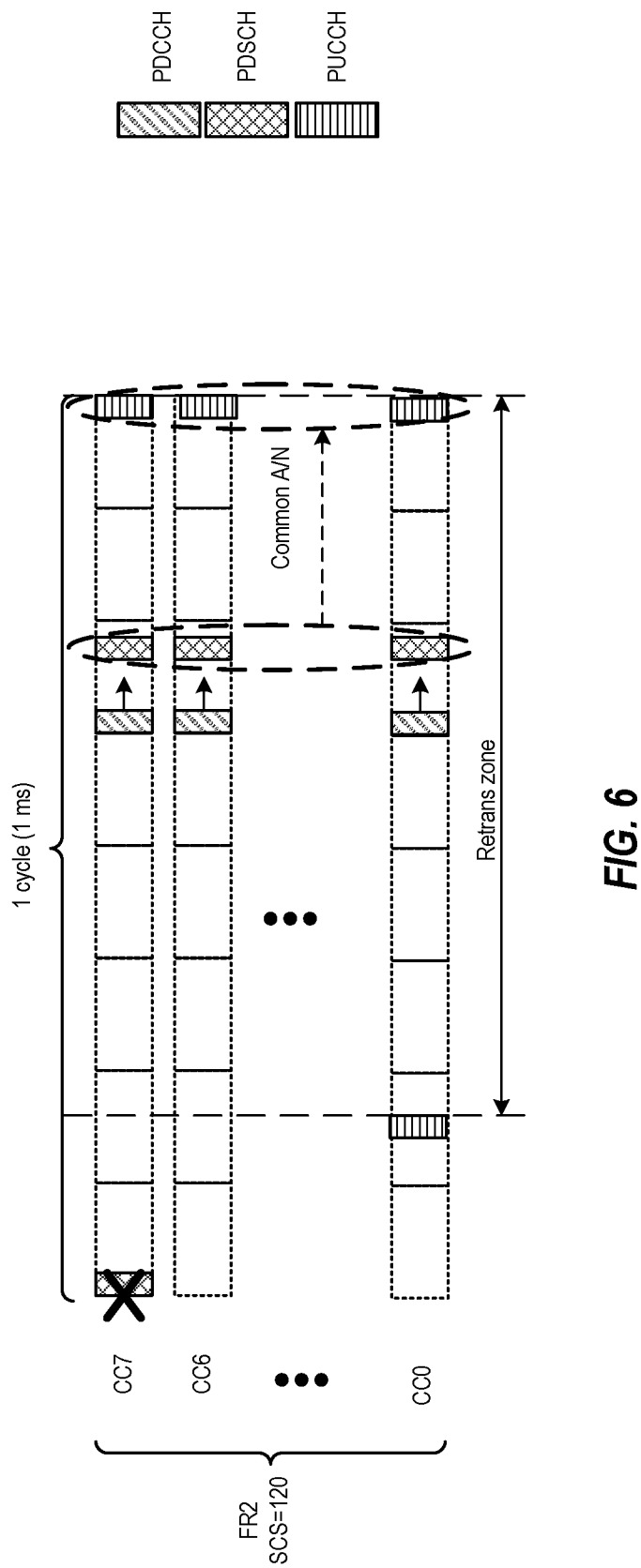
FIG. 6 is a diagram illustrating wireless communication that supports scheduling based on DCI.

Referring to FIG. 6 an example of wireless communication that supports scheduling based on DCI is shown. To illustrate, the wireless communication may include DCI based xCarrier repetition on UL channels. A common A/N is generated based on combining or individual decoding, and can be sent by PUCCH cell configured per PDSCH repetition receiving cell. In some implementations, to improve UL reliability, a DCI (e.g., 484), such as a single DCI, can also schedule xCarrier repetition of PUCCH/PUSCH. To illustrate, the PUCCH per PUCCH group can be repeated over a set of CCs. In some implementations, to save DCI overhead, same indicator can indicate xCarrier PDSCH and PUCCH repetition.

Figure 7:
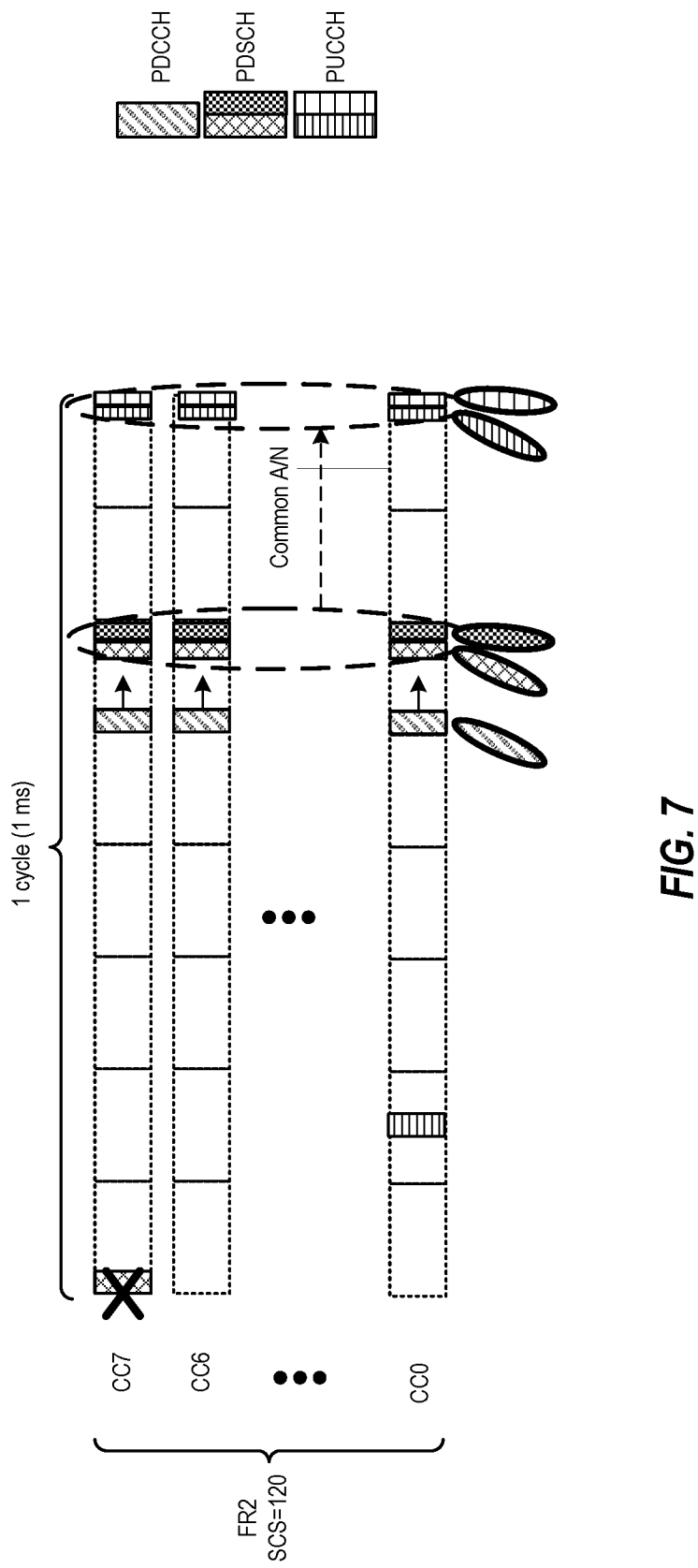
FIG. 7 is a diagram illustrating wireless communication that supports scheduling based on DCI.

Referring to FIG. 7, an example of wireless communication that supports scheduling based on DCI is shown. To illustrate, the wireless communication may include DCI based xCarrier repetition and beam sweep. To further improve DCI reliability, a DCI (e.g., 484), such as a single DCI, can schedule xCarrier repetition and beam sweep for PDSCH/PUCCH/PUSCH. In some implementations, the same beam sweep pattern on one CC can be applied to each CC of a set of CCs. The beam sweep pattern per channel on one CC can be TDMed, SDMed, FDMed. Additionally, in some implementations, xCarrier PDCCH repetition (not shown) can be configured with beam sweep to mitigate blocking.

Figure 8:
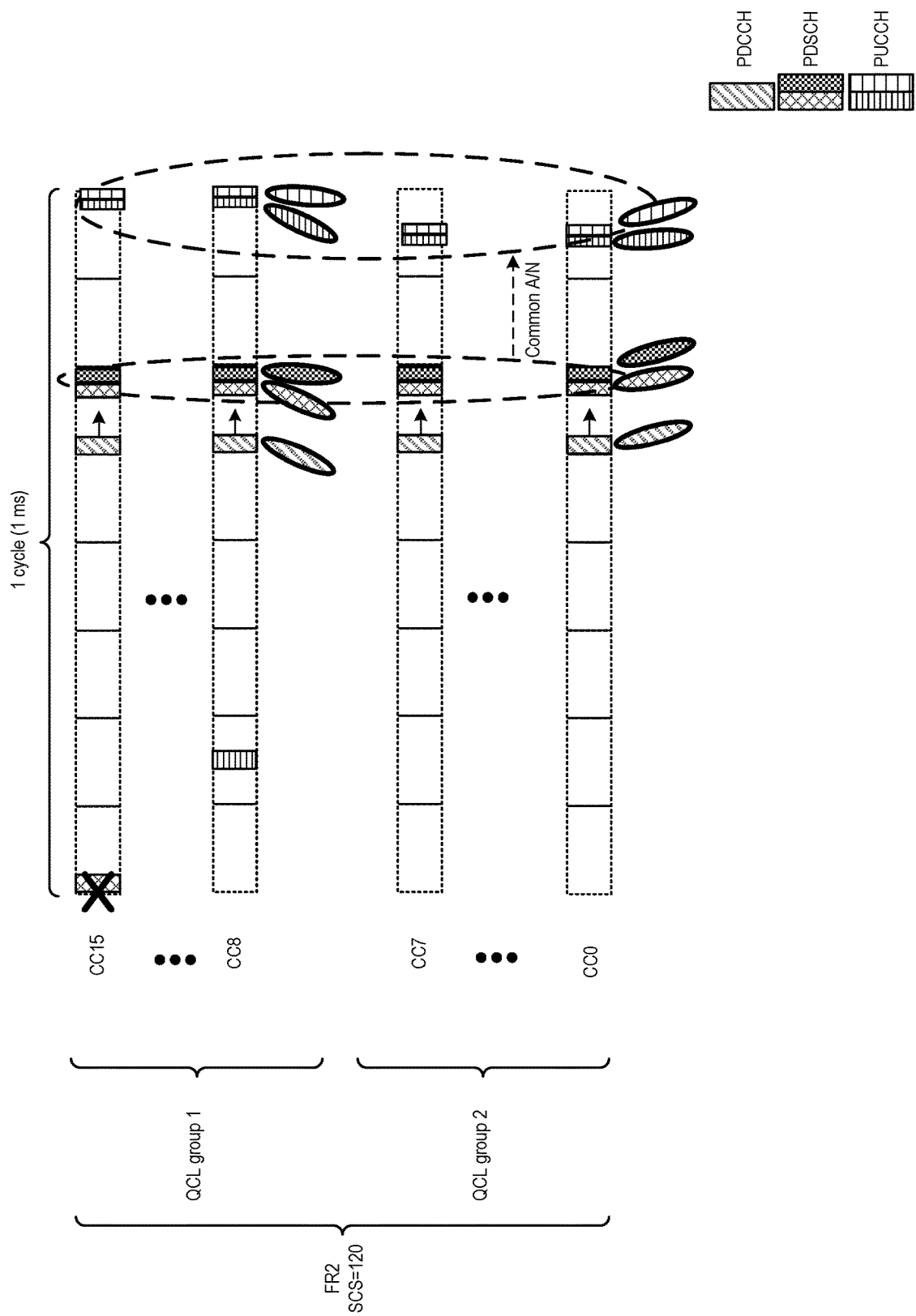
FIG. 8 is a diagram illustrating wireless communication that supports scheduling based on DCI.

Referring to FIG. 8, an example of wireless communication that supports scheduling based on DCI is shown. To illustrate, the wireless communication may include DCI based xCarrier repetition and beam sweep. As shown in FIG. 8, a UE (e.g., 115) supports multiple xCarrier QCL groups such as a first QCL group (e.g., "QCL group 1") and a second QCL group (e.g., "QCL group 2"). To illustrate, a DCI (e.g., 484), such as a single DCI, indicates xCarrier repetition and beam sweep pattern per QCL group for PDSCH/PUCCH/PUSCH. In such implementations, a common ACK/NACK can be carried by each of PUCCHs with xCarrier repetition and beam sweep. In other implementations, a common ACK/NACK can be carried by each of PUCCHs with xCarrier repetition without beam sweep. It is noted that, if UE does not support simultaneous PUCCH Tx by multiple beams, PUCCH Tx per QCL group may have to be TDMed.

Figure 9:
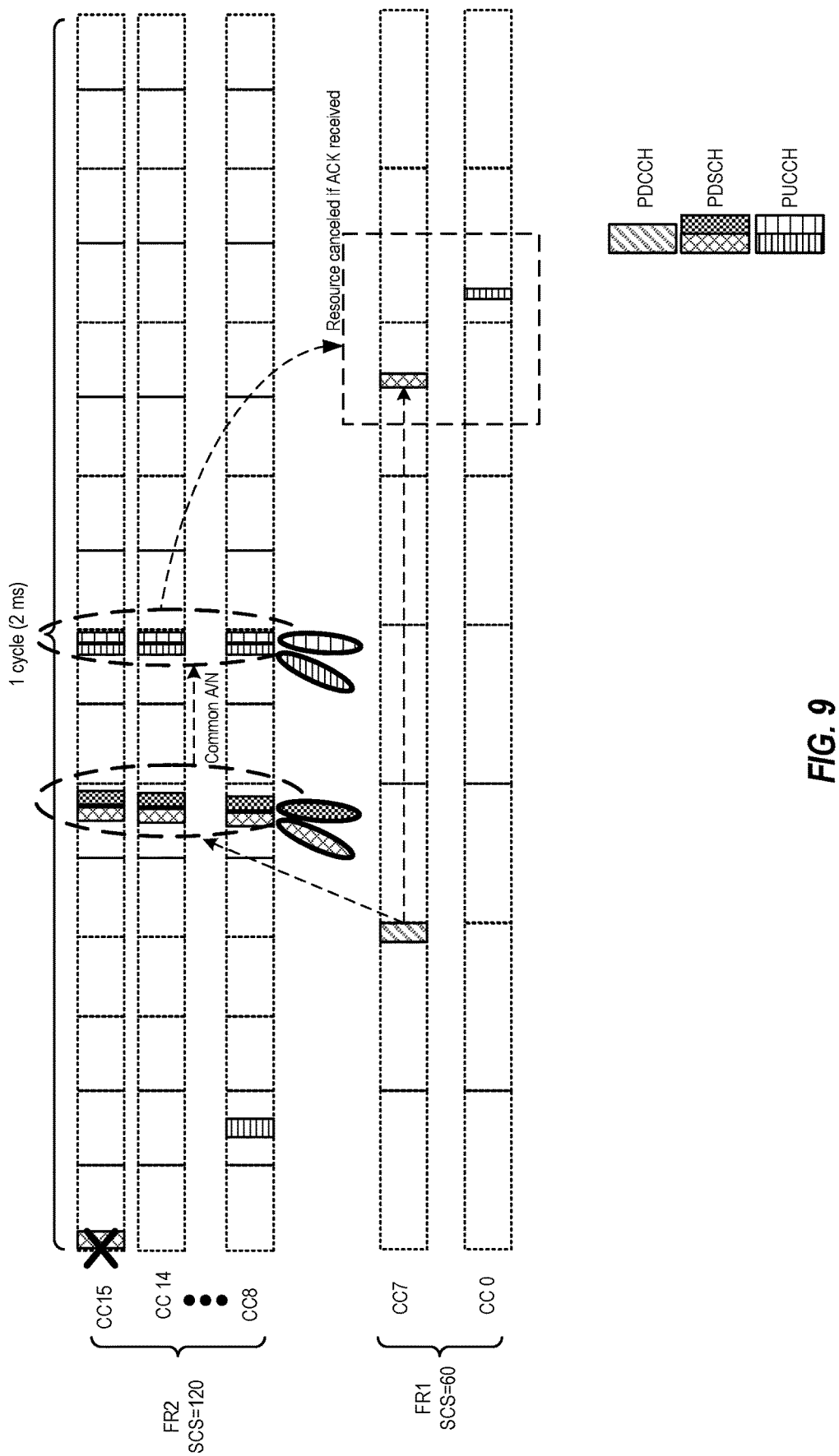
FIG. 9 is a diagram illustrating wireless communication that supports scheduling based on DCI.

Referring to FIG. 9, an example of wireless communication that supports scheduling based on DCI is shown. To illustrate, the wireless communication may include DCI based xCarrier repetition and beam sweep. As shown in FIG. 9, FR1 and FR2 are present. In presence of FR1, a DCI (e.g., 484), such as a single DCI, can be sent on FR1 to schedule xCarrier repetition and beam sweep. For example, DCI scheduling xCarrier repetition and beam sweep can be sent on FR1 at least in addition to those sent on FR2 to improve control robustness, while minimizing resource usage on FR1. For example, the same DCI on FR1 can also schedule repetitions on FR1, whose resource can be canceled or reassigned if ACK has been received on FR2.

As described with reference to at least FIGS. 4-9, the described techniques relate to improved methods, systems, devices, and apparatuses for scheduling one or more transmissions using DCI (e.g., 448). For example, the one or more transmission may be scheduled, based on the DCI, on one or more entities different from the entity via which the DCI is transmitted. The entity may include a component carrier, a cell, or a frequency allocation. If the DCI is received via a first entity, such as a first CC, the one or more transmission may be scheduled on a second entity (different from the first entity) based on the DCI. In some implementations, a transmission may also be scheduled on the first entity in addition to the second entity. As an illustrative, non-limiting example, a UE may receive DCI via an entity of a plurality of entities and schedule, based on the DCI, multiple transmissions on different entities of the plurality of entities. In some implementations, each of the multiple transmissions scheduled on the different entities includes the same content. In other implementations, each of the multiple transmissions scheduled on the different entities include content correlated to content of the other of the multiple transmissions. In yet another implementation, each of the multiple transmissions scheduled on the different entities include independent content from the other of the multiple transmissions.

The one or more transmissions (or the multiple transmissions) may correspond to a channel, which may include PDSCH, PUCCH, PUSCH, or PRACH, as illustrative, non-limiting examples. In some implementations, the DCI is a single DCI used to schedule multiple transactions across multiple entities (e.g., multiple CCs) such that identical, correlated, or independent information is communicated per transmission. Additionally, or alternatively, the same, single DCI can be repeated over a set of two or more CCs to facilitate UE combining. When the same, single DCI is repeated over the set of two or more CCs, only one DCI of the multiple DCIs needs to be received to schedule one or more transmission on a particular CC, which may be a different CC from which the on DCI was received.

In some aspects, scheduling, based on the DCI, multiple transmissions on different entities may be scrambled by a dedicated RNTI. In some such implementations, the dedicated RNTI is different from the RNTI for scrambling the DCI scheduling a single transmission on a single entity.

In some implementations, a device (e.g., a base station or a UE) may identify DCI communicated via a first entity of plurality of entities, and schedule one or more transmission via a second entity of the plurality of entities, the second entity different from the first entity. Additionally, or alternatively, the entity may include a component carrier, a cell, or a frequency allocation.

In some aspects, the DCI, such as a single DCI, can include or indicate scheduling information. For example, the DCI may include scheduling information for each of multiple transmission. The scheduling information may include a frequency domain allocation (e.g., a number of RBs, a location of one or more RBs, or both), a time domain allocation (e.g., a start time, a duration, or both), a beam indication (e.g., a TCI state, a spatial relation, or a beam sweep pattern—a TDMed beam, a FDMed beam, a SDMed beam, or a combination thereof), a DMRS configuration (e.g., typeA/typeB, an initialization sequence, one or more antenna portions, or a combination thereof), a cell ID, a BWP ID, or a combination thereof. Additionally, or alternatively, the scheduling information may include HARQ information (e.g., a HARQ ID, a HARQ process ID, CBG information, redundancy version, or a combination thereof), UL feedback information (e.g., a PUCCH resource indicator, time distance from PDSCH to PUCCH, DL assignment index, or a combination thereof), link adaptation information (e.g., a MCS, TPC command, SRS/CSI request, or a combination thereof), or a combination thereof. In some implementations, a common ACK/NACK may be generated based on combining or individual decoding, and can be sent by PUCCH cell configured per PDSCH repetition receiving cell.

In some implementations, a UE may identify the scheduling information included in the DCI. Additionally, the UE may schedule on or more transmissions (e.g., multiple transmission) based on the identified scheduling information. Additionally, or alternatively, the UE may transmit a common ACK/NACK using multiple transmissions on the different entities of the plurality of entities.

In some implementations, the UE may decode the DCI and, based on the decoded DCI, identify a repetition pattern. For example, in some implementations, a single DCI can schedule xCarrier repetition of PDSCH. For example, the DCI can include an index of a pre-configured repetition pattern, such as a candidate repetition pattern that includes a non-repetition pattern with one transmission on one entity. In some implementations, the repetition pattern indicates a channel is repeated over a set of one of one or more entities and a format/location of the channel per entity. As another example, xCarrier repetition can be scheduled with a pre-configured pattern, such as a pre-configured pattern indicated by one or more bits (e.g., a single bit) of the DCI. Additionally, or alternatively, the same DCI can repeated over a set of CCs to facilitate UE combining.

In some implementations, a single DCI can schedule xCarrier repetition of PUCCH/PUSCH. In other implementations, a single DCI can schedule xCarrier repetition and beam sweep for PDSCH/PUCCH/PUSCH. In some such implementations, xCarrier PDCCH repetition can be further configured with beam sweep to mitigate blocking.

In some implementations, a UE supports multiple xCarrier QCL groups. In such implementations, a single DCI can indicate xCarrier repetition and beam sweep pattern per QCL group for PDSCH/PUCCH/PUSCH.

In some implementations, in presence of a frequency range, such as FR1 in 5G, a DCI scheduling xCarrier repetition and beam sweep can also be sent on the first frequency range at least in addition to those sent on a frequency range, such as FR2 in 5G, to improve control robustness, while minimizing resource usage on the first frequency range. The same DCI on the first frequency range can also schedule repetitions on the first frequency range, whose resource can be canceled or reassigned if ACK is been received on the second frequency range.

In some implementations, the UE may perform, based on the DCI, beam sweep for a channel, such as PDSCH, PUCCH, PUSCH, or a combination thereof, as illustrative, non-limiting examples. The beam sweep may be applied to each entity of the different entities or may be scheduled per entity. In some implementations, the beam sweep includes a beam sweep pattern that includes a TDMed beam, a FDMed beam, a SDMed beam, or a combination thereof.

In some aspects, the DCI is received via a different entity from the entities via which the multiple transmission are scheduled. Additionally, or alternatively, some implementations may include receiving the DCI, decoding the DCI, and identifying a repetition pattern based on the decoded DCI. In other implementations, the repetition pattern may be identified based on the DCI. The repetition pattern may be indicated by one or more bits (e.g., a single bit) included in the DCI. Additionally, or alternatively, the repetition pattern indicates a set of one or more entities and a format/location per entity.

In some aspects, the same DCI is repeated over a set of entities of the plurality of entities. Additionally, or alternatively, a common ACK/NACK may be communicated (e.g., transmitted or received) using the multiple transmissions on the different entities of the plurality of entities.

In some aspects, a beam sweep for a channel may be scheduled based on the DCI.

The channel includes PDSCH, PUCCH, PUSCH, or a combination thereof, as illustrative, non-limiting examples. The beam sweep may be applied to each entity of the different entities or may be scheduled per entity. The beam sweep includes a beam sweep pattern that includes a TDMed beam, a FDMed beam, a SDMed beam, or a combination thereof, as illustrative, non-limiting examples.

In some aspects, different entities of the plurality of entities include entities of different QCL groups. In some implementations, the DCI indicates carrier repetition, a beam sweep pattern, or both, per QCL group.

Thus, FIGS. 4-9 describes scheduling using DCI. For example, scheduling using DCI may be used with mmWave for communication between base station 105 and UE 115. Accordingly, as compared to conventional techniques in which one transmission is scheduled per DCI on an entity (e.g., a CC) via which the DCI was received, the present techniques provide scheduling of one or more transmissions on at least one entity different from the entity via which the DCI was communicated, thereby improving performance, reliability, and scheduling.

Figures 10, 11:
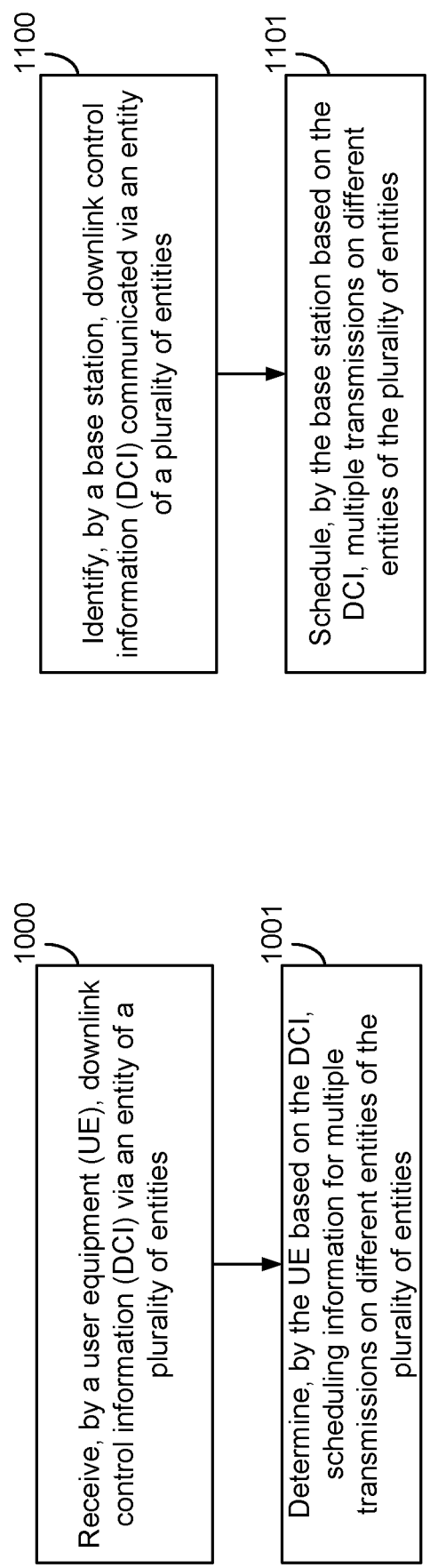
FIG. 10 is a block diagram illustrating example blocks executed by a UE configured according to an aspect of the present disclosure.
FIG. 11 is a block diagram illustrating example blocks executed by a base station configured according to an aspect of the present disclosure.
Figure 12:
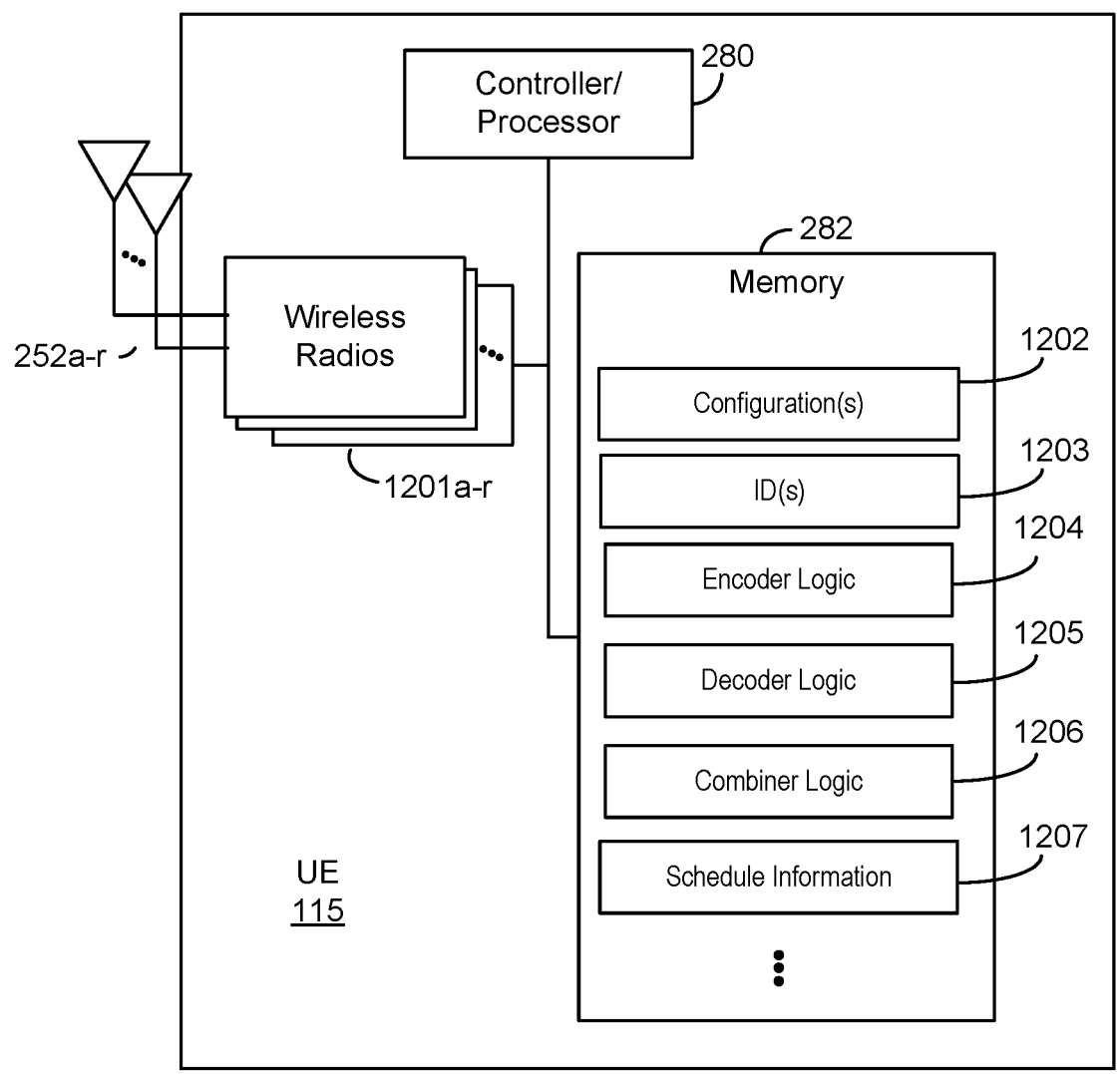
FIG. 12 is a block diagram conceptually illustrating a design of a UE according to some aspects of the present disclosure.
Figure 13:
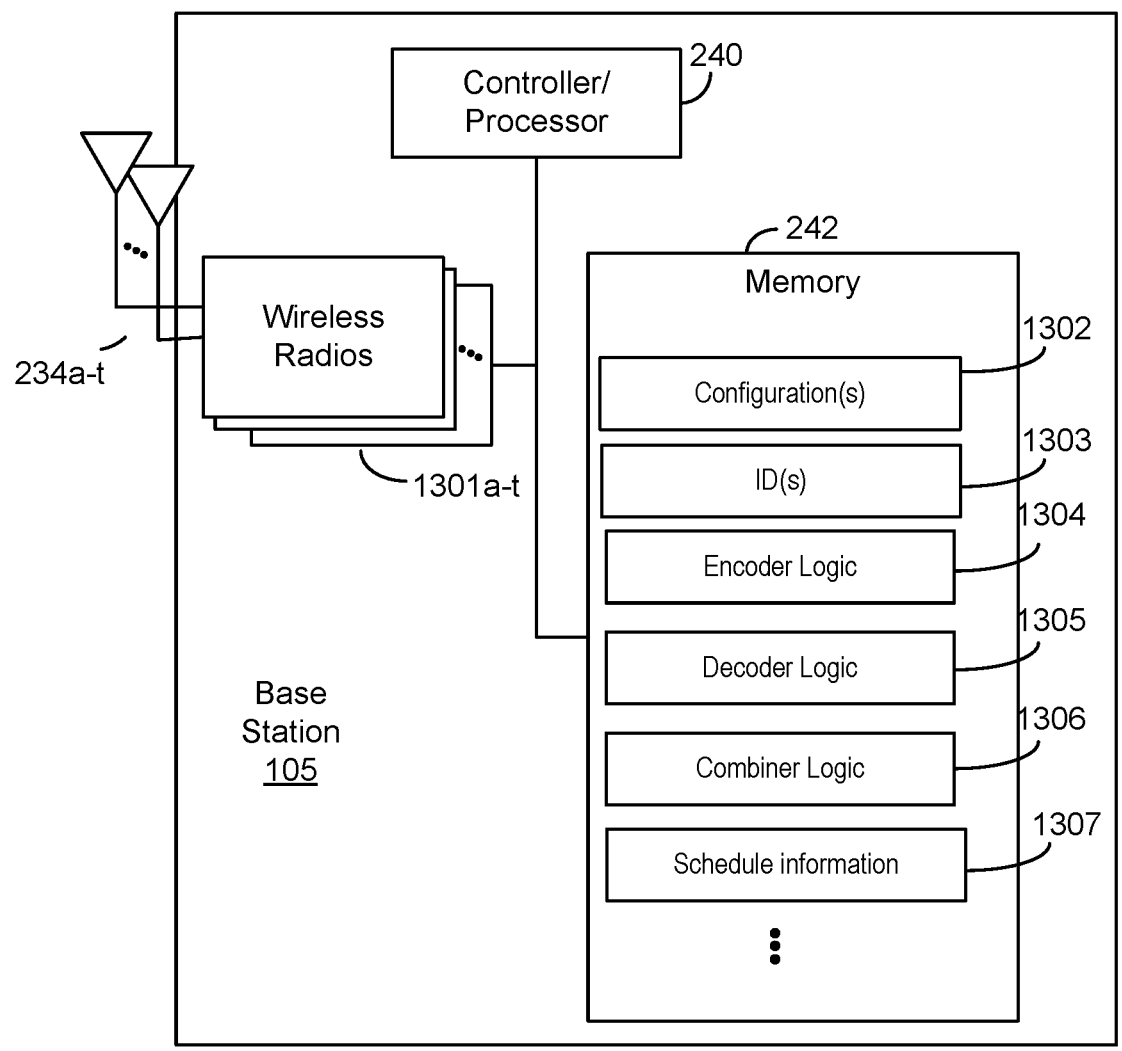
FIG. 13 is a block diagram conceptually illustrating a design of a base station configured according to some aspects of the present disclosure.

FIG. 10 is a block diagrams illustrating example blocks executed by a UE configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2 or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1201a-r and antennas 252a-r. Wireless radios 1201a-r includes various components and hardware, as illustrated in FIG. 2 for UE 115, including modulator/demodulators 254a-r, MIMO detector 256, receive processor 258, transmit processor 264, and TX MIMO processor 266. As shown, memory 282 may include one or more configurations 1202, one or more IDs 1203, encoder logic 1204, decoder logic 1205, combination logic 1206, and schedule information 1207. Configurations 1202 and IDs 1203 may include or correspond to configurations 421 and ID(s) 422, respectively. Schedule information 1207 may include or correspond to schedule information 423. In some implementations, memory 242 may also include scheduler logic configured to parse DCI, identify schedule information (e.g., schedule information included in a DCI), access configurations 1202, access or set schedule information 1207, configure one or more of wireless radios 1201a-r, or a combination thereof. Encoder logic 1204, decoder logic 1205, combination logic 1206, or the scheduler logic may include or correspond to encoder 413, decoder 414, and combination 415, respectively. In some aspects, encoder logic 1204, decoder logic 1205, and combination logic 1406 may include or correspond to processor(s) 402. UE 115 may receive signals from or transmit signal to a base station, such as base station 105 as illustrated in FIG. 13.

Referring to FIG. 10, at block 1000, the UE receives DCI via an entity of a plurality of entities. For example, UE 115 may execute, under control of controller/processor 280, one or more instructions, stored in memory 282 to receive the DCI. At block 1001, the UE determines schedule information for multiple transmissions on different entities of the plurality of entities. To illustrate, the UE may identify scheduling information included in or indicated by the DCI and may, based on the scheduling information, schedule receipt or configure the UE to receive at least one of the multiple transmissions. For example, UE 115 may execute, under control of controller/processor 280, one or more instructions, stored in memory 282 to schedule the multiple transmissions.

It is noted that one or more blocks (or operations) described with reference to FIG. 10 may be combined with one or more blocks (or operations) of another of figure. For example, one or more blocks of FIG. 1000 may be combined with one or more blocks (or operations) of another of FIG. 2, 4, or 112. Additionally, or alternatively, one or more operations described above with reference to FIGS. 1-9 may be combine with one or more operations described with reference to FIG. 10.

FIG. 11 is a block diagrams illustrating example blocks executed by a base station configured according to an aspect of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIG. 2 or 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1301a-t and antennas 234a-t. Wireless radios 1301a-t includes various components and hardware, as illustrated in FIG. 2 for base station 105, including modulator/demodulators 232a-t, transmit processor 220, TX MIMO processor 230, MIMO detector 236, and receive processor 238. As shown, memory 242 may include one or more configurations 1302, one or more IDs 1303, encoder logic 1304, decoder logic 1305, combination logic 1306, and schedule information 1307. CC configurations 1302 and IDs 1303 may include or correspond to CC configurations 441 and ID(s) 442, respectively. Schedule information 1307 may include or correspond to schedule information 443. Encoder logic 1304, decoder logic 1305, and combination logic 1306 may include or correspond to encoder 437, decoder 438, and combination 439, respectively. In some implementations, memory 242 may also include scheduler logic configured to parse DCI, identify schedule information (e.g., schedule information included in a DCI), access configurations 1302, access or set schedule information 1307, configure one or more of wireless radios 1301a-t, or a combination thereof. In some aspects, encoder logic 1304, decoder logic 1305, combination logic 1306, or the scheduler logic may include or correspond to processor(s) 430. Base station 105 may receive signals from or transmit signal to a UE, such as UE 115 as illustrated in FIG. 12.

Referring to FIG. 11, at block 1100, the base station identifies DCI communicated via an entity of a plurality of entities. For example, base station 105 may execute, under control of controller/processor 240, one or more instructions, stored in memory 242 to identify the DCI. At block 1101, the base station schedules, based on the DCI, multiple transmissions on different entities of the plurality of entities. For example, base station 105 may execute, under control of controller/processor 240, one or more instructions, stored in memory 242 to schedule the multiple transmission.

It is noted that one or more blocks (or operations) described with reference to one of FIG. 11 may be combined with one or more blocks (or operations) of another figure. For example, one or more blocks of FIG. 11 may be combined with one or more blocks (or operations) of another of FIG. 2, 4, or 13. Additionally, or alternatively, one or more operations described above with reference to FIGS. 1-9 may be combine with one or more operations described with reference to FIG. 11.

In some aspects, techniques for scheduling one or more transmissions using DCI may include additional aspects, such as any single aspect or any combination of aspects described below or in connection with one or more other processes or devices described elsewhere herein. In some aspects, scheduling one or more transmissions using DCI may include an apparatus receiving DCI via an entity of a plurality of entities; and determining, based on the DCI, scheduling information for multiple transmissions on different entities of the plurality of entities. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a first aspect, the DCI includes the scheduling information for the multiple transmissions on different entities is scrambled by a dedicated RNTI.

In a second aspect, alone or in combination with the first aspect, the dedicated RNTI is different from the RNTI for scrambling the DCI scheduling a single transmission on a single entity.

In a third aspect, alone or in combination with one or more of the first through second aspects, the multiple transmissions correspond to a channel.

In a fourth aspect, in combination with the third aspects, the channel includes PDSCH, PUCCH, PUSCH, or PRACH.

In a fifth aspect, each of the multiple transmissions scheduled on the different entities include the same content.

In a sixth aspect, each of the multiple transmissions scheduled on the different entities include content correlated to content of the other of the multiple transmissions.

In a seventh aspect, each of the multiple transmissions scheduled on the different entities include independent content from the other of the multiple transmissions.

In an eighth aspect, alone or in combination with one or more of the first through seventh aspects, the DCI includes the scheduling information for each of the multiple transmissions.

In a ninth aspect, in combination with the eighth aspect, the apparatus identifies the scheduling information included in the DCI; and schedules receipt of at least one of the multiple transmission based on the identified scheduling information.

In a tenth aspect, in combination with the eighth aspect, the scheduling information indicates a frequency domain allocation.

In an eleventh aspect, in combination with the tenth aspect, the frequency domain allocation includes a number of RBs, a location of one or more RBs, or both.

In a twelfth aspect, in combination with the eighth aspect, the scheduling information indicates a time domain allocation.

In a thirteenth aspect, in combination with the twelfth aspect, the time domain allocation includes a start time, a duration, or both.

In a fourteenth aspect, in combination with the eighth aspect, the scheduling information includes a beam indication.

In a fifteenth aspect, in combination with the fourteenth aspect, the beam indication indicates a TCI state, a spatial relation, a beam sweep pattern, or a combination thereof.

In a sixteenth aspect, in combination with the fifteenth aspect, the beam sweep pattern includes a TDMed beam, a FDMed beam, a SDMed beam, or a combination thereof.

In a seventeenth aspect, in combination with the eighth aspect, the scheduling information includes a DMRS configuration.

In an eighteenth aspect, in combination with the seventeenth aspect, the DMRS configuration includes typeA/typeB, an initialization sequence, one or more antenna portions, or a combination thereof.

In a nineteenth aspect in combination with the eighth aspect, the scheduling information includes a cell ID, a BWP ID, or both.

In a twentieth aspect, in combination with the eighth aspect, the scheduling information includes HARQ information.

In a twenty-first aspect, in combination with the twentieth aspect, the HARQ information includes a HARQ process ID, CBG information, redundancy version, or a combination thereof.

In a twenty-second aspect, in combination with the eighth aspect, the scheduling information includes UL feedback information.

In a twenty-third aspect, in combination with the twenty-second aspect, the UL feedback information includes a PUCCH resource indicator, time distance from PDSCH to PUCCH, DL assignment index, or a combination thereof.

In a twenty-fourth aspect, in combination with the eighth aspect, the scheduling information includes link adaptation information.

In a twenty-fifth aspect, in combination with the twenty-fourth aspect, the link adaptation information includes a MCS, TPC command, SRS/CSI request, or a combination thereof.

In a twenty-sixth aspect, the DCI is received via a different entity from the entities via which the multiple transmissions are scheduled.

In a twenty-seventh aspect, the apparatus decodes the DCI, and identifies a repetition pattern based on the decoded DCI.

In a twenty-eighth aspect, in combination with the twenty-seventh aspect, the repetition pattern is indicated in the DCI by an index of a pre-configured candidate repetition pattern.

In a twenty-ninth aspect, in combination with the twenty-eighth aspect, the candidate repetition pattern includes a non-repetition pattern with one transmission on one entity.

In a thirtieth aspect, in combination with the twenty-seventh aspect, the repetition pattern indicates a channel is repeated over a set of one or more entities and a format/location of the channel per entity.

In a thirty-first aspect, the same DCI is repeated over a set of entities of the plurality of entities.

In a thirty-second aspect, the entity includes a component carrier, a cell, or a frequency allocation.

In a thirty-third aspect, the apparatus transmits a common ACK/NACK using the multiple transmissions on the different entities of the plurality of entities.

In a thirty-fourth aspect, the apparatus performs, based on the DCI, beam sweep for a channel.

In a thirty-fifth aspect, in combination with the thirty-fourth aspect, the channel includes PDSCH, PUCCH, PUSCH, or a combination thereof.

In a thirty-sixth aspect, in combination with the thirty-fourth aspect, the same beam sweep is applied to each entity of the different entities.

In a thirty-seventh aspect, in combination with the thirty-fourth aspect, the beam sweep is scheduled per entity.

In a thirty-eighth aspect, in combination with the thirty-fourth aspect, the beam sweep includes a beam sweep pattern that includes a TDMed beam, a FDMed beam, a SDMed beam, or a combination thereof.

In a thirty-ninth aspect, the different entities include entities of different QCL groups.

In a fortieth aspect, in combination with the thirty-ninth aspect, the DCI indicates carrier repetition, a beam sweep pattern, or both, per QCL group.

In a forty-first aspect, the different entities include entities in a first frequency range and a second frequency range.

In a forty-second aspect, in combination with the thirty-fourth aspect forty-first aspect, the DCI indicates carrier repetition, a beam sweep pattern, or both, on entities of the first frequency range; and one or more transmissions on the second frequency range are canceled or reassigned in response to an ACK received on the second frequency range.

In some aspects, an apparatus configured for wireless communication, such as a base station, is configured to identifying DCI communicated via an entity of a plurality of entities; and scheduling, based on the DCI, multiple transmissions on different entities of the plurality of entities. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a forty-third aspect, the DCI scheduling multiple transmissions on different entities is scrambled by a dedicated RNTI.

In a forty-fourth aspect, in combination with the forty-third aspect, the dedicated RNTI is different from the RNTI for scrambling the DCI scheduling a single transmission on a single entity.

In a forty-fifth aspect, the multiple transmissions correspond to a channel.

In a forty-sixth aspect, in combination with the forty-fifth aspect, the channel includes PDSCH, PUCCH, PUSCH, or PRACH.

In a forty-seventh aspect, each of the multiple transmissions scheduled on the different entities include the same content.

In a forty-eighth aspect, each of the multiple transmissions scheduled on the different entities include content correlated to content of the other of the multiple transmissions.

In a forty-ninth aspect, each of the multiple transmissions scheduled on the different entities include independent content from the other of the multiple transmissions.

In a fiftieth aspect, the DCI includes scheduling information for each of the multiple transmissions.

In a fifty-first aspect, in combination with the fiftieth aspect, the apparatus transmits the DCI to a UE.

In a fifty-second aspect, in combination with the fiftieth aspect, the scheduling information indicates a frequency domain allocation.

In a fifty-third aspect, in combination with the fifty-second aspect, the frequency domain allocation includes a number of RBs, a location of one or more RBs, or both.

In a fifty-fourth aspect, in combination with the fiftieth aspect, the scheduling information indicates a time domain allocation.

In a fifty-fifth aspect, in combination with the fifty-fourth aspect, the time domain allocation includes a start time, a duration, or both.

In a fifty-sixth aspect, in combination with the fiftieth aspect, the scheduling information includes a beam indication.

In a fifty-seventh aspect, in combination with the fifty-sixth aspect, the beam indication indicates a TCI state, a spatial relation, a beam sweep pattern, or a combination thereof.

In a fifty-eighth aspect, in combination with the fifty-seventh aspect, the beam sweep pattern includes a TDMed beam, a FDMed beam, a SDMed beam, or a combination thereof.

In a fifty-ninth aspect, in combination with the fiftieth aspect, the scheduling information includes a DMRS configuration.

In a sixtieth aspect, in combination with the fifty-ninth aspect, the DMRS configuration includes typeA/typeB, an initialization sequence, one or more antenna portions, or a combination thereof.

In a sixty-first aspect, in combination with the fiftieth aspect, the scheduling information includes a cell ID, a BWP ID, or both.

In a sixty-second aspect, in combination with the fiftieth aspect, the scheduling information includes HARQ information.

In a sixty-third aspect in combination with the sixty-second aspect, the HARQ information includes a HARQ process ID, CBG information, redundancy version, or a combination thereof.

In a sixty-fourth aspect, in combination with the fiftieth aspect, the scheduling information includes UL feedback information.

In a sixty-fifth aspect, in combination with the sixty-fourth aspect, the UL feedback information includes a PUCCH resource indicator, time distance from PDSCH to PUCCH, DL assignment index, or a combination thereof.

In a sixty-sixth aspect, in combination with the fiftieth aspect, the scheduling information includes link adaptation information.

In a sixty-seventh aspect, in combination with the sixty-sixth aspect, the link adaptation information includes a MCS, TPC command, SRS/CSI request, or a combination thereof.

In a sixty-eighth aspect, the DCI is received via a different entity from the entities via which the multiple transmission are scheduled.

In a sixty-ninth aspect, the apparatus decodes the DCI, and identifies a repetition pattern based on the decoded DCI.

In a seventieth aspect, in combination with the sixty-ninth aspect, the repetition pattern is indicated in the DCI by an index of a pre-configured candidate repetition pattern.

In a seventy-first aspect, in combination with the seventieth aspect, the candidate repetition pattern includes a non-repetition pattern with one transmission on one entity.

In a seventy-second aspect, in combination with the sixty-ninth aspect, the repetition pattern indicates a channel is repeated over a set of one or more entities and a format/location of the channel per entity.

In a seventy-third aspect, the same DCI is repeated over a set of entities of the plurality of entities.

In a seventy-fourth aspect, the entity includes a component carrier, a cell, or a frequency allocation.

In a seventy-fifth aspect, the apparatus receives a common ACK/NACK using the multiple transmissions on the different entities of the plurality of entities.

In a seventy-sixth aspect, the apparatus performs, based on the DCI, beam sweep for a channel.

In a seventy-seventh aspect, in combination with the seventy-sixth aspect, the channel includes PDSCH, PUCCH, PUSCH, or a combination thereof.

In a seventy-eighth aspect, in combination with the seventy-sixth aspect, the same beam sweep is applied to each entity of the different entities.

In a seventy-ninth aspect, in combination with the seventy-sixth aspect, the beam sweep is scheduled per entity.

In a eightieth aspect, in combination with the seventy-sixth aspect, the beam sweep includes a beam sweep pattern that includes a TDMed beam, a FDMed beam, a SDMed beam, or a combination thereof.

In a eighty-first aspect, the different entities include entities of different QCL groups.

In a eighty-second aspect, in combination with the eighty-first aspect, the DCI indicates carrier repetition, a beam sweep pattern, or both, per QCL group.

In a eighty-third aspect, the different entities include entities of frequency range and frequency range.

In a eighty-fourth aspect, in combination with the eighty-third aspect, the DCI indicates carrier repetition, a beam sweep pattern, or both, on entities of the first frequency range; and one or more transmissions on the second frequency range are canceled or reassigned in response to an ACK received on the second frequency range.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 4) may include processors, electronics devices, hardware devices, electronics components, logical circuits, memories, software codes, firmware codes, etc., or any combination thereof. The functional blocks and modules in FIGS. 10-11 may include processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus configured for wireless communication, the apparatus comprising one or more processors coupled to one or more memories and configured to:
   receive downlink control information (DCI) via a first entity of a plurality of entities; and
   determine, based on the DCI, scheduling information for multiple transmissions on second entities of the plurality of entities and a repetition pattern,
   wherein each entity of the second entities is distinct from the first entity, and
   wherein the repetition pattern indicates:
      that a channel is repeated over a set of one or more entities of the plurality of entities, and
      a format/location of the channel per entity, and
   wherein:
      the one or more processors are further configured to decode the DCI and initiate transmission of a common ACK/NACK using the multiple transmissions on the second entities of the plurality of entities, wherein the repetition pattern is indicated in the DCI by an index of a pre-configured candidate repetition pattern, and wherein the pre-configured candidate repetition pattern includes a non-repetition pattern with one transmission on one entity; or
      the repetition pattern is included in the scheduling information, and wherein the repetition pattern comprises an indicator configured to indicate Physical Downlink Shared Channel (PDSCH) repetition and Physical Uplink Control Channel (PUCCH) repetition.

2. The apparatus of claim 1, wherein:
   the one or more processors are further configured to scramble, by a dedicated radio network temporary identifier (RNTI), the scheduling information of the multiple transmissions on different entities; and
   the dedicated RNTI is different from an RNTI that is configured to scramble a single transmission on a single entity.

3. The apparatus of claim 1, wherein the one or more processors are further configured to:
   decode the DCI; and
   initiate the transmission of the common ACK/NACK using the multiple transmissions on the second entities of the plurality of entities,
   wherein the repetition pattern is indicated in the DCI by the index of the pre-configured candidate repetition pattern, and
   wherein the pre-configured candidate repetition pattern includes the non-repetition pattern with the one transmission on the one entity.

4. The apparatus of claim 1, wherein a same DCI is repeated over a set of entities of the plurality of entities.

5. The apparatus of claim 1, wherein the repetition pattern is included in the scheduling information, and wherein the repetition pattern comprises the indicator configured to indicate Physical Downlink Shared Channel (PDSCH) repetition and Physical Uplink Control Channel (PUCCH) repetition.

6. The apparatus of claim 1, wherein the one or more processors are further configured to:
   transmit, based on the scheduling information, a first Physical Uplink Control Channel (PUCCH) on a first component carrier (CC) of the set of one or more entities and a second PUCCH on a second CC of the set of one or more entities.

7. The apparatus of claim 1, wherein the one or more processors are further configured to:
   perform, based on the DCI, a beam sweep for a channel, wherein the channel includes a Physical Downlink Shared Channel (PDSCH), a Physical Uplink Control Channel (PUCCH), a Physical Uplink Shared Channel (PUSCH), or a combination thereof, and a same beam sweep is applied to each entity of the second entities.

8. The apparatus of claim 1, wherein the one or more processors are further configured to:
   identify the scheduling information included in the DCI; and schedule receipt of at least one of the multiple transmissions based on the scheduling information, wherein:
the DCI includes the scheduling information for each of the multiple transmissions; and
the scheduling information includes a cell identifier (ID), a bandwidth part (BWP) ID, or both.

9. The apparatus of claim 1, wherein:
the scheduling information indicates a frequency domain allocation, a time domain allocation, or both; and
the frequency domain allocation includes a number of resource blocks (RBs), a location of one or more RBs, or both, and the time domain allocation includes a start time, a duration, or both.

10. The apparatus of claim 1, wherein:
the scheduling information includes a beam indication; and
the beam indication indicates a transmission configuration indicator (TCI) state, a spatial relation, a beam sweep pattern, or a combination thereof, wherein the beam sweep pattern includes a time division multiplexed (TDMed) beam, a frequency division multiplexed (FDMed) beam, a spatial division multiplexed (SDMed) beam, or a combination thereof.

11. The apparatus of claim 1, wherein:
the scheduling information includes a demodulation reference signal (DMRS) configuration; and
the DMRS configuration includes typeA/typeB, an initialization sequence, one or more antenna portions, or a combination thereof.

12. The apparatus of claim 1, wherein:
the scheduling information includes hybrid automatic repeat request (HARQ) information; and
the HARQ information includes a HARQ process ID, code block group (CBG) information, redundancy version, or a combination thereof.

13. The apparatus of claim 1, wherein:
the scheduling information includes uplink (UL) feedback information; and
the UL feedback information includes a Physical Uplink Control Channel (PUCCH) resource indicator, time distance from a Physical Downlink Shared Channel (PDSCH) to PUCCH, downlink (DL) assignment index, or a combination thereof.

14. The apparatus of claim 1, wherein:
the scheduling information includes link adaptation information; and
the link adaptation information includes a modulation code scheme (MC S), Transmit power control (TPC) command, sounding reference signal (SRS)/channel state information (CSI) request, or a combination thereof.

15. The apparatus of claim 1, wherein:
the second entities include entities of different quasi co-located (QCL) groups; and
the DCI indicates carrier repetition, a beam sweep pattern, or both, per QCL group.

16. A method for wireless communication, comprising:
receiving downlink control information (DCI) via a first entity of a plurality of entities; and
determining, based on the DCI, scheduling information for multiple transmissions on second entities of the plurality of entities and a repetition pattern,
wherein each entity of the second entities is distinct from the first entity, and
wherein the repetition pattern indicates:
that a channel is repeated over a set of one or more entities of the plurality of entities, and
a format/location of the channel per entity, and wherein:
the method further comprises decoding the DCI and initiating transmission of a common ACK/NACK using the multiple transmissions on the second entities of the plurality of entities, wherein the repetition pattern is indicated in the DCI by an index of a pre-configured candidate repetition pattern, and wherein the pre-configured candidate repetition pattern includes a non-repetition pattern with one transmission on one entity; or
the repetition pattern is included in the scheduling information, and wherein the repetition pattern comprises an indicator configured to indicate Physical Downlink Shared Channel (PDSCH) repetition and Physical Uplink Control Channel (PUCCH) repetition.

17. The method of claim 16, wherein:
the method comprises scrambling, by a dedicated radio network temporary identifier (RNTI), the scheduling information of the multiple transmissions on different entities; and
the dedicated RNTI is different from an RNTI that is configured to scramble a single transmission on a single entity.

18. The method of claim 16, wherein the method comprises:
decoding the DCI; and
initiating the transmission of the common ACK/NACK using the multiple transmissions on the second entities of the plurality of entities,
wherein the repetition pattern is indicated in the DCI by the index of the pre-configured candidate repetition pattern, and
wherein the pre-configured candidate repetition pattern includes the non-repetition pattern with the one transmission on the one entity.

19. The method of claim 16, wherein a same DCI is repeated over a set of entities of the plurality of entities.

20. The method of claim 16, wherein the repetition pattern is included in the scheduling information, and wherein the repetition pattern comprises the indicator configured to indicate Physical Downlink Shared Channel (PDSCH) repetition and Physical Uplink Control Channel (PUCCH) repetition.

21. The method of claim 16, wherein the method comprises:
transmitting, based on the scheduling information, a first Physical Uplink Control Channel (PUCCH) on a first component carrier (CC) of the set of one or more entities and a second PUCCH on a second CC of the set of one or more entities.

22. The method of claim 16, wherein the method comprises:
performing, based on the DCI, a beam sweep for a channel,
wherein the channel includes a Physical Downlink Shared Channel (PDSCH), a Physical Uplink Control Channel (PUCCH), a Physical Uplink Shared Channel (PUSCH), or a combination thereof, and a same beam sweep is applied to each entity of the second entities.

23. The method of claim 16, wherein the method comprises:
identifying the scheduling information included in the DCI; and
scheduling receipt of at least one of the multiple transmissions based on the scheduling information, wherein:

the DCI includes the scheduling information for each of the multiple transmissions; and the scheduling information includes a cell identifier (ID), a bandwidth part (BWP) ID, or both.

24. The method of claim 16, wherein:

the scheduling information indicates a frequency domain allocation, a time domain allocation, or both; and the frequency domain allocation includes a number of resource blocks (RBs), a location of one or more RBs, or both, and the time domain allocation includes a start time, a duration, or both.

25. The method of claim 16, wherein:

the scheduling information includes a beam indication; and the beam indication indicates a transmission configuration indicator (TCI) state, a spatial relation, a beam sweep pattern, or a combination thereof, wherein the beam sweep pattern includes a time division multiplexed (TDMed) beam, a frequency division multiplexed (FDMed) beam, a spatial division multiplexed (SDMed) beam, or a combination thereof.

26. The method of claim 16, wherein:

the scheduling information includes a demodulation reference signal (DMRS) configuration; and the DMRS configuration includes typeA/typeB, an initialization sequence, one or more antenna portions, or a combination thereof.

27. The method of claim 16, wherein:

the scheduling information includes hybrid automatic repeat request (HARQ) information; and the HARQ information includes a HARQ process ID, code block group (CBG) information, redundancy version, or a combination thereof.

28. The method of claim 16, wherein:

the scheduling information includes uplink (UL) feedback information; and the UL feedback information includes a Physical Uplink Control Channel (PUCCH) resource indicator, time distance from a Physical Downlink Shared Channel (PDSCH) to PUCCH, downlink (DL) assignment index, or a combination thereof.

29. The method of claim 16, wherein:

the scheduling information includes link adaptation information; and the link adaptation information includes a modulation code scheme (MCS), Transmit power control (TPC) command, sounding reference signal (SRS)/channel state information (CSI) request, or a combination thereof.

30. The method of claim 16, wherein:

the second entities include entities of different quasi co-located (QCL) groups; and the DCI indicates carrier repetition, a beam sweep pattern, or both, per QCL group.

* * * * *